United States Patent
Nishi et al.

(10) Patent No.: US 8,336,651 B2
(45) Date of Patent: Dec. 25, 2012

(54) CHARGE/DISCHARGE CONTROL DEVICE FOR SECONDARY BATTERY AND HYBRID VEHICLE USING THE SAME

(75) Inventors: Yuji Nishi, Nagoya (JP); Tomokazu Yamauchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 849 days.

(21) Appl. No.: 12/375,587

(22) PCT Filed: Jul. 27, 2007

(86) PCT No.: PCT/JP2007/065220
§ 371 (c)(1),
(2), (4) Date: Jan. 29, 2009

(87) PCT Pub. No.: WO2008/016129
PCT Pub. Date: Feb. 7, 2008

(65) Prior Publication Data
US 2010/0000809 A1 Jan. 7, 2010

(30) Foreign Application Priority Data
Aug. 1, 2006 (JP) ................................. 2006-209751

(51) Int. Cl.
*B60W 10/24* (2006.01)
(52) U.S. Cl. ...................... 180/65.29; 320/134; 320/136
(58) Field of Classification Search .............. 180/65.29, 180/65.21; 320/132, 134, 136; 702/63; 324/426; 701/36
See application file for complete search history.

(56) References Cited

U.S. PATENT DOCUMENTS

| | | | | |
|---|---|---|---|---|
| 7,514,902 B2 * | 4/2009 | Tsuchiya et al. | ............... | 320/132 |
| 7,683,579 B2 * | 3/2010 | Kim et al. | ..................... | 320/132 |
| 7,880,597 B2 * | 2/2011 | Uchida | .......................... | 340/439 |
| 8,018,203 B2 * | 9/2011 | Nishi et al. | ..................... | 320/136 |
| 8,180,508 B2 * | 5/2012 | Kawai | ............................. | 701/22 |

(Continued)

FOREIGN PATENT DOCUMENTS

JP 11-136808 * 5/1999
(Continued)

OTHER PUBLICATIONS

W.B. Gu and C.Y. Wang: *Thermal-Electrochemical Coupled Modeling of a Lithium-ion Cell*, 2000, vol. 99-25 (1), Gate Center for Advanced Energy Storage, Department of Mechanical Engineering & Pennsylvania Transportation Institute, The Pennsylvania State University, University Park, PA 16802, USA.

*Primary Examiner* — Katy M Ebner
*Assistant Examiner* — Emma K Frick
(74) *Attorney, Agent, or Firm* — Kenyon & Kenyon LLP

(57) ABSTRACT

A state estimation value indicating a battery state is successively calculated from time to time according to a battery model capable of dynamically estimating the internal state of the secondary battery by using an inspection value of a sensor group indicating the secondary battery behavior. By using the sate estimation value at each moment estimated by the battery model expression at each predetermined cycle, an I/O-enabled time is predicted when a predetermined power is continuously inputted (charged) or outputted (discharged) from the current moment. A load operation instruction of the secondary battery is set so as to avoid overcharge and overdischarge of the secondary battery according to the operation request to the load and by considering the predicted characteristics between input/output power and input/output-allowed time.

9 Claims, 13 Drawing Sheets

U.S. PATENT DOCUMENTS

| | | | |
|---|---|---|---|
| 2005/0083017 A1* | 4/2005 | Suzuki | 320/128 |
| 2007/0013347 A1* | 1/2007 | Kamohara | 320/160 |
| 2010/0033132 A1* | 2/2010 | Nishi et al. | 320/136 |
| 2010/0036628 A1* | 2/2010 | Plestid | 702/63 |
| 2010/0241376 A1* | 9/2010 | Kikuchi et al. | 702/63 |
| 2011/0068719 A1* | 3/2011 | Oya | 318/139 |

FOREIGN PATENT DOCUMENTS

| | | | |
|---|---|---|---|
| JP | 11-136808 A | | 5/1999 |
| JP | 2002-243813 A | | 8/2002 |
| JP | 2003-17139 A | | 1/2003 |
| JP | 2003-297435 A | | 10/2003 |
| JP | 2003-346919 A | | 12/2003 |
| JP | 2004-007954 A | | 1/2004 |
| JP | 2005-137091 A | | 5/2005 |
| JP | 2005-195388 | * | 7/2005 |
| JP | 2005-195388 A | | 7/2005 |
| JP | 2006-42497 A | | 2/2006 |

* cited by examiner

FIG.4

| | | |
|---|---|---|
| $\phi_s$ | POTENTIAL IN SOLID STATE [V] | |
| $\phi_e$ | POTENTIAL IN ELECTROLYTE [V] | |
| $R_f$ | INTERFACE DC RESISTANCE (SEI FILM DC RESISTANCE) [Ω] | |
| $c_s$ | Li ION CONCENTRATION OF ACTIVE MATERIAL [mol/cm$^2$] | |
| $c_e$ | Li ION CONCENTRATION OF ELECTROLYTE [mol/cm$^2$] | |
| $c_{se}$ | Li ION CONCENTRATION AT ACTIVE MATERIAL INTERFACE [mol/cm$^2$] | |
| U | SINGLE ELECTRODE OCV OF POSITIVE/NEGATIVE ELECTRODE [V] | |
| $U_0$ | POTENTIAL AT REFERENCE TEMPERATURE OF POSITIVE/NEGATIVE ELECTRODE [V] | |
| T | TEMPERATURE [K] | |
| $T_0$ | REFERENCE TEMPERATURE [K] | |
| $/i_{nj}$ | TRANSPORT CURRENT DENSITY [A/cm$^2$] | |
| $/i_{0j}$ | EXCHANGE CURRENT DENSITY [A/cm$^2$] | |
| $j^{Li}$ | REACTION CURRENT [A/cm$^3$], $\int j^{Li} \cdot dv = I$ | |
| k | ION CONDUCTIVITY [S/cm] | |
| $k^{eff}$ | EFFECTIVE ION CONDUCTIVITY | |
| $k_D^{eff}$ | DIFFUSION CONDUCTIVITY COEFFICIENT | |
| $t_+^0$ | TRANSPORT RATE | |
| $\sigma$ | ELECTRON CONDUCTIVITY IN SOLID STATE [S/cm] | |
| $\gamma$ | BENDING DEGREE | |
| $\varepsilon_e, \varepsilon_s$ | ELECTROLYTE VOLUME FRACTION, ACTIVE MATERIAL VOLUME FRACTION | |
| $r_s$ | ELECTRODE ACTIVE MATERIAL RADIUS [cm] | |
| $\rho$ | DENSITY [g/cm$^3$] | |
| $c_p$ | THERMAL CAPACITY [J/kg·K] | |
| R | GAS CONSTANT [J/mol·K] | |
| F | FARADAY CONSTANT [C/mol] | |
| $a_s$ | ACTIVE MATERIAL SURFACE AREA PER UNIT VOLUME OF ELECTRODE | |
| $D_s$ | DIFFUSION COEFFICIENT (ACTIVE MATERIAL) | |
| $D_e^{eff}$ | DIFFUSION COEFFICIENT (ELECTROLYTE) | |
| $f_\pm$ | MEAN MOLAR ACTIVITY COEFFICIENT OF ELECTROLYTE | |
| $\lambda$ | THERMAL CONDUCTIVITY [W/cm·K] | |

CHARGE/DISCHARGE CONTROL DEVICE FOR SECONDARY BATTERY AND HYBRID VEHICLE USING THE SAME

This is a 371 national phase application of PCT/JP2007/065220 filed 27 Jul. 2007, claiming priority to Japanese Patent Application No. 2006-209751 filed 1 Aug. 2006, the contents of which are incorporated herein by reference.

TECHNICAL FIELD

The present invention relates to a charge/discharge control device for a secondary battery and a hybrid vehicle using the same, and more particularly to secondary battery charge/discharge control using a battery model capable of dynamically estimating an internal state of a battery.

BACKGROUND ART

A power supply system has been used which is configured to be able to supply power to load equipment using a rechargeable secondary battery and charge the secondary battery even during operation of the load equipment as necessary. Typically, such power supply systems are mounted on hybrid vehicles, electric vehicles, or the like including electric motors driven by secondary batteries as driving power sources. For example, in an electric vehicle, the vehicle is driven by driving a motor using power stored in the secondary battery. On the other hand, in a hybrid vehicle, the vehicle is driven by driving a motor using electric power stored in the secondary battery, or the vehicle is driven by driving the motor with the assistance of an engine. In a fuel cell vehicle, the vehicle is driven by driving a motor using electric power from a fuel cell, or the vehicle is driven by driving the motor using electric power stored in a secondary battery in addition to the electric power from the fuel cell.

In particular, in a hybrid vehicle formed to drive a generator using an internal combustion engine mounted on the vehicle to generate power, with which a secondary battery can be charged, SOC (State Of Charge) needs to be controlled to be at about midpoint (50-60%) between a fully charged state (100%) and a non-charged state (0%) so that the secondary battery can receive regenerative power and supply power to the motor immediately upon request.

Furthermore, when a secondary battery is overcharged or overdischarged, the battery performance is degraded and the lifetime is shortened, and therefore, charge/discharge has to be controlled by grasping SOC of the secondary battery. In general, charge/discharge control is performed in such a manner that excessive charge/discharge is restricted by properly setting inputtable/outputtable power (Win, Wout), which indicates the upper limit values of charging power and discharging power of a secondary battery, according to a battery state.

In addition, as a manner of secondary battery charge/discharge restriction, Japanese Patent Laying-Open No. 2005-137091 (referred to as Patent Document 1 hereinafter) discloses a control configuration in which charging electricity by regenerative braking is restricted according to a battery state during regenerative braking so as to prolong the lifetime of a secondary battery mounted on a vehicle. Specifically, during regenerative braking of the vehicle, the degree of deterioration of the secondary battery due to charge during regenerative braking is predicted, and in addition, the charging electricity during regenerative braking is restricted based on the predicted degree of deterioration.

Furthermore, W. B. Gu and C. Y. Wang, "THERMAL-ELECTROCHEMICAL COUPLED MODELING OF A LITHIUM-ION CELL," ECS Proceedings Vol. 99-25 (1), pp 743-762 (referred to as Non Patent Document 1) proposes modeling for estimating a battery state using a battery model of capable of estimating the battery internal electrochemical reaction, for example, in a lithium-ion battery, as a technique of performing charge/discharge control by accurately estimating the remaining capacity (SOC) based on a secondary battery internal state.

DISCLOSURE OF THE INVENTION

However, in the secondary battery control device and control method as disclosed in the aforementioned Patent Document 1, the degree of deterioration progress is predicted and charge/discharge restriction is performed based on the predicted value only under particular conditions, for example, only during regenerative braking. Therefore, there is need for improvement in terms of reliable prevention of overcharge and overdischarge.

Moreover, as in the general configuration as described above, with the charge/discharge restriction in which only inputtable/outputtable power (Win, Wout) as the upper limit value of the charging/discharging power is set, such charge/discharge control is difficult in that the maximum battery performance is achieved for the long term.

The present invention is made in order to solve such problems, and an object of the present invention is to provide a charge/discharge control device for a secondary battery capable of carrying out charge/discharge control such that the battery performance is maximized, in addition to preventing overcharge and overdischarge, and a hybrid vehicle using the same.

In accordance with the present invention, a charge/discharge control device for a secondary battery configured to be capable of receiving/transmitting electric power from/to a load includes a battery state estimation portion, an input/output-allowed time prediction portion, and a load control portion. The battery state estimation portion is configured to sequentially calculate a state estimation value indicative of a battery state according to a battery model capable of dynamically estimating an internal state of the secondary battery, based on a detection value by a sensor provided for the secondary battery. The input/output-allowed time prediction portion is configured to predict an input/output-allowed time for which the secondary battery can continuously input/output a prescribed power from a present time, based on the state estimation value at present estimated by the battery state estimation portion. The load control portion is configured to generate an operation command for the load such that overcharge and overdischarge of the secondary battery are avoided, based on an operation request to the load, in consideration of the time predicted by the input/output-allowed time prediction portion.

According to the charge/discharge control device for a secondary battery as described above, a state estimation value at present as calculated by the battery model capable of dynamically estimating the internal state of the secondary battery is used to predict an input/output-allowed time for which charge/discharge can be executed with prescribed power continuously from the present time. As a result, based on the internal state of the secondary battery at the present time, the characteristic of the input/output-allowed time with respect to the input/output power can be obtained. Therefore, based on this characteristic, charge/discharge control can be performed in which charge/discharge restriction is set step by step such that overcharge and overdischarge are avoided and the battery performance is maximized.

Preferably, the input/output-allowed time prediction portion is configured to predict the respective input/output-allowed times continuously from a present time, for a plurality of prescribed power.

Because of such a configuration, the input/output power-input/output-allowed time characteristic, which reflects the internal state of the secondary battery at the present time, is found in detail and is utilized in charge/discharge restriction.

Preferably, the input/output-allowed time prediction portion is configured to be activated every prescribed period to predict, at a time of each activation, an input/output-allowed time during which the secondary battery can input/output the prescribed power continuously from that point of time.

Because of such a configuration, charge/discharge control can be performed by sequentially updating the input/output power-input/output-allowed time characteristic every prescribed period thereby appropriately reflecting the internal state of the secondary battery at each point of time.

Alternatively, preferably, the input/output-allowed time prediction portion is configured to include: a voltage transition prediction portion predicting a transition of an output voltage of the secondary battery in a case where the secondary battery inputs/outputs the prescribed power continuously from a present time; and a time prediction portion predicting a time from the present time to a time at which the output voltage reaches an upper limit voltage or a lower limit voltage of the secondary battery, based on prediction by the voltage transition prediction portion.

Because of such a configuration, the time required for the output voltage of the secondary battery to reach the upper limit voltage or the lower limit voltage by continuous charge/discharge of prescribed power can be predicted as an input/output-allowed time, so that charge/discharge control can be executed in such a manner that the secondary battery does not exceed the upper limit voltage or the lower limit voltage.

Alternatively, in accordance with the present invention, a charge/discharge control device for a secondary battery configured to be capable of receiving/transmitting electric power from/to a load includes: a battery state estimation portion, a deterioration rate prediction portion, and a load control portion. The battery state estimation portion is configured to sequentially calculate a state estimation value indicative of a battery state according to a battery model capable of dynamically estimating an internal state of the secondary battery, based on a detection value by a sensor provided for the secondary battery. The deterioration rate prediction portion is configured to predict a deterioration rate of the secondary battery in a case where the secondary battery inputs/outputs prescribed power continuously from a present time, based on the state estimation value at a present time estimated by the battery state estimation portion. The load control portion is configured to generate an operation command for the load in consideration of the deterioration rate predicted by the deterioration rate prediction portion, based on an operation request to the load.

According to the charge/discharge control device for a secondary battery as described above, the internal state of the secondary battery is sequentially estimated based on the battery model, and in addition, a predicted deterioration rate in a case where prescribed power is continuously charged/discharged can be found using the state estimation value using the battery model. Thus, charge/discharge restriction of the secondary battery can be performed in such a manner that the internal state of the secondary battery at each point of time is appropriately reflected and that consideration is given so that deterioration does not proceed rapidly due to overdischarge or overcharge of the secondary battery.

Preferably, the deterioration rate prediction portion is configured to predict the respective deterioration rates for a plurality of prescribed power.

Because of such a configuration, the input/output power-predicted deterioration rate characteristic at the present time, which reflects the internal state of the secondary battery at the present time, is found in detail by finding a predicted deterioration rate for prescribed power in multiple cases and is then utilized in charge/discharge restriction.

Preferably, the charge/discharge control device for a secondary battery further includes a deterioration degree estimation portion estimating a deterioration degree or a remaining lifetime of the secondary battery, based on the detection value by the sensor. Then, the load control portion is configured to find a deterioration rate range permissible at a present time, in consideration of the deterioration degree or the remaining lifetime estimated by the deterioration degree estimation portion, and in addition, to generate an operation command for the load with restriction within such a charge/discharge power range of the secondary battery in that the deterioration rate predicted by the deterioration rate prediction portion falls within the deterioration rate range.

Because of such a configuration, the permissible range of deterioration rate can be changed based on the deterioration degree or the remaining lifetime of the secondary battery at the present time. Accordingly, charge/discharge restriction of the secondary battery can be performed in which the deterioration degree of the secondary battery at the present time is reflected and consideration is given so that deterioration does not proceed rapidly to shorten the battery life.

Preferably, in the charge/discharge control device for a secondary battery as described above, the secondary battery is formed of a lithium-ion battery, and the state estimation value includes a lithium ion concentration distribution in the interior of the secondary battery.

According to the charge/discharge control device for a secondary battery as described above, a lithium-ion battery is a control target, whose output characteristic varies depending on the distribution state of lithium ion concentration in the interior of the battery. Therefore, as in the present invention, the charge/discharge control based on estimation of the internal reaction of the battery by the battery model effectively brings about the effect of avoiding overcharge and overdischarge and maximizing the battery performance.

In accordance with the present invention, a hybrid vehicle includes an internal combustion engine and a motor configured to be capable of generating a driving power of a vehicle, a control device, a secondary battery, and a charge/discharge control device for the secondary battery. The control device is configured to determine a driving power output by each of the internal combustion engine and the motor such that a required driving power for the vehicle as a whole is secured. Then, the charge/discharge control device sequentially calculates a state estimation value indicative of a battery state according to a battery model capable of dynamically estimating an internal state of the secondary battery, based on a detection value by a sensor provided for the secondary battery, and in addition, predicts an input/output-allowed time during which the secondary battery can input/output prescribed power continuously from a present time, based on the state estimation value at present as estimated. Furthermore, the control device sets an input/output permissible power of the motor with restriction within such a charge/discharge power range of the secondary battery in that overcharge and overdischarge of the secondary battery are avoided, in consideration of the input/ output-allowed time predicted by the charge/discharge control device, and in addition, determines a torque command value of the motor with restriction such that input/output power of the motor falls within a range of the input/output permissible power.

Preferably, in the hybrid vehicle, the charge/discharge control device is configured to predict the respective input/output-allowed times continuously from a present time, for a plurality of prescribed power. Then, the control device is configured to set input/output permissible power of the motor based on the input/output-allowed time predicted for the plurality of prescribed power.

Preferably, in the hybrid vehicle, the charge/discharge control device is configured to predict, at every prescribed period, an input/output-allowed time during which the secondary battery can continuously input/output the prescribed power from that point of time.

Alternatively, preferably, in the hybrid vehicle, the charge/discharge control device is configured to predict a time from the present time to a time at which the output voltage reaches an upper limit voltage or a lower limit voltage of the secondary battery, in a case where the secondary battery inputs/outputs the prescribed power continuously from a present time, based on the state estimation value at present as estimated, and to predict an input/output-allowed time for which the secondary battery can continuously input/output prescribed power from a present time based on the prediction.

In accordance with another aspect of the present invention, a hybrid vehicle includes an internal combustion engine and a motor configured to be capable of generating a driving power of a vehicle, an internal combustion engine and a motor configured to be capable of generating a driving power of a vehicle, a control device, a secondary battery, and a charge/discharge control device for the secondary battery. The control device is configured to determine a driving power output by each of the internal combustion engine and the motor such that a required driving power for the vehicle as a whole is secured. Then, the charge/discharge control device is configured to sequentially calculate a state estimation value indicative of a battery state according to a battery model capable of dynamically estimating an internal state of the secondary battery, based on a detection value by a sensor provided for the secondary battery, and in addition, to predict a deterioration rate of the secondary battery in a case where the secondary battery inputs/outputs prescribed power continuously from a present time, based on the state estimation value at a present time as estimated. Furthermore, the control device is configured to set an input/output permissible power of the motor with restriction within such a charge/discharge power range of the secondary battery in that deterioration of the secondary battery does not proceed significantly, based on the deterioration rate predicted by the charge/discharge control device, and in addition, to determine a torque command value of the motor with restriction such that input/output power of the motor falls within a range of the input/output permissible power.

Preferably, in the hybrid vehicle, the charge/discharge control device is configured to predict the respective deterioration rates for a plurality of prescribed power. Then, the control device is configured to set input/output permissible power of the motor based on the deterioration rate predicted for the plurality of prescribed power.

Preferably, the charge/discharge control device is configured to further estimate a deterioration degree or a remaining lifetime of the secondary battery, based on the detection value by the sensor. Furthermore, the control device is configured to find a deterioration rate range permissible at a present time, in consideration of the deterioration degree or the remaining lifetime estimated by the charge/discharge control device, and in addition, to determine a charge/discharge power range of the secondary battery with restriction such that the predicted deterioration rate falls within the deterioration rate range.

Preferably, in the hybrid vehicle, the secondary battery is formed of a lithium-ion battery, and the state estimation value includes a lithium ion concentration distribution in the interior of the secondary battery.

In the hybrid vehicle as mentioned above, based on the charge/discharge restriction of the secondary battery using a motor as a load, in which consideration is given so that overcharge or overdischarge or rapid deterioration progress of the secondary battery does not occur, a required driving power for the entire vehicle can be secured.

BRIEF DESCRIPTION OF THE DRAWINGS

FIG. 4 is a diagram showing a list of variables and constants used in the battery model portion.

BEST MODES FOR CARRYING OUT THE INVENTION

Figure 1:
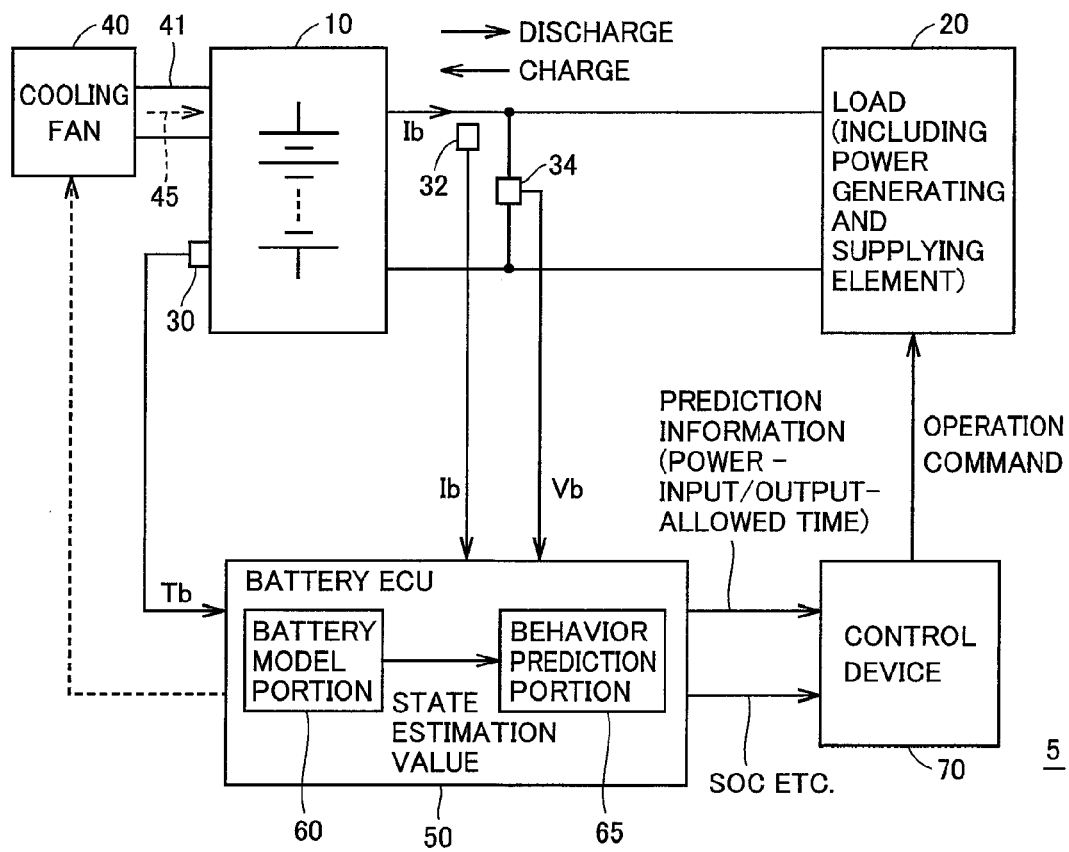
FIG. 1 is a schematic block diagram illustrating a configuration of a power supply system including a secondary battery controlled by a charge/discharge control device for a secondary battery in accordance with an embodiment of the present invention.

In the following, the embodiments of the present invention will be described in detail with reference to the figures. It is noted that in the following, the same or corresponding parts in the figures will be denoted with the same reference characters and the description thereof is basically not repeated.

First Embodiment

FIG. 1 is a schematic block diagram illustrating a configuration of a power supply system including a secondary battery controlled by a charge/discharge control device for a secondary battery in accordance with an embodiment of the present invention.

Referring to FIG. 1, a power supply system 5 includes a secondary battery 10, a load 20, a cooling fan 40 for the secondary battery, and a battery ECU 50 and a control device 70, each formed of an Electronic Control Unit (ECU). Each ECU is typically formed of a microcomputer and a memory (RAM: Random Access Memory, ROM: Read Only Memory, or the like) for executing prescribed sequences and prescribed operations programmed in advance. Battery ECU 50 and control device 70 realize "charge/discharge control device" which carries out charge/discharge restriction as illustrated below.

Typically, a lithium-ion battery is used as rechargeable secondary battery 10. Lithium ion batteries are suitably adopted for the present invention, because their output characteristic varies depending on the distribution state of lithium ion concentration in the interior of the battery.

Secondary battery 10 is provided with a temperature sensor 30 measuring a battery temperature Tb, a current sensor 32 measuring input/output current Ib (also referred to as battery current Ib hereinafter) of secondary battery 10, and a voltage sensor 34 measuring a terminal-to-terminal voltage Vb (also referred to as battery output voltage Vb hereinafter) between the positive electrode and the negative electrode.

Cooling fan 40 is connected to secondary battery 10 through a coolant passage 41 to supply cooling air 45 as "coolant" to coolant passage 41. Although not shown, secondary battery 10 is provided with a coolant channel as appropriate so that each cell of secondary battery 10 can be cooled by cooling air 45 supplied through coolant passage 41. The actuation/termination of cooling fan 40 and the coolant supply rate during operation are controlled by battery ECU 50.

Load 20 is driven by an output voltage from secondary battery 10. Furthermore, a not-shown power generating and supplying element is provided to be included in load 20 or is provided separately from load 20, so that secondary battery 10 can be charged by charging current from the power generation/feeding element. Therefore, during discharge of secondary battery 10, battery current $Ib>0$, and during charge of secondary battery 10, battery current $Ib<0$.

Battery ECU 50 is configured to include a battery model portion 60 and a behavior prediction portion 65. Here, each of battery model portion 60 and behavior prediction portion 65 corresponds to a functional block realized by execution of a prescribed program by battery ECU 50. Battery model portion 60 sequentially calculates a state estimation value indicative of a battery state every prescribed period, in accordance with a battery model capable of dynamically estimating the internal state of secondary battery 10 based on detection values from sensors 30, 32, 34 provided for secondary battery 10.

Behavior prediction portion 65 generates and outputs to control device 70 prediction information in a case where secondary battery 10 is continuously charged/discharged with prescribed power, based on a prescribed prediction operation using a state estimation value calculated by battery model portion 60. In the first embodiment, this prediction information indicates a predicted input/output-allowed time when certain prescribed power is input (charge) or output (discharge) continuously from the present time.

Control device 70 generates an operation command for load 20, based on an operation request to load 20, and based on charge/discharge restriction such that overcharge/overdischarge of secondary battery 10 does not occur, in consideration of prediction information from battery ECU 50.

Now, the configuration and the model of the secondary battery will be described in detail. Secondary battery 10 shown in FIG. 1 is configured as a battery pack in which a plurality of battery cells 10# are connected.

Figure 2:
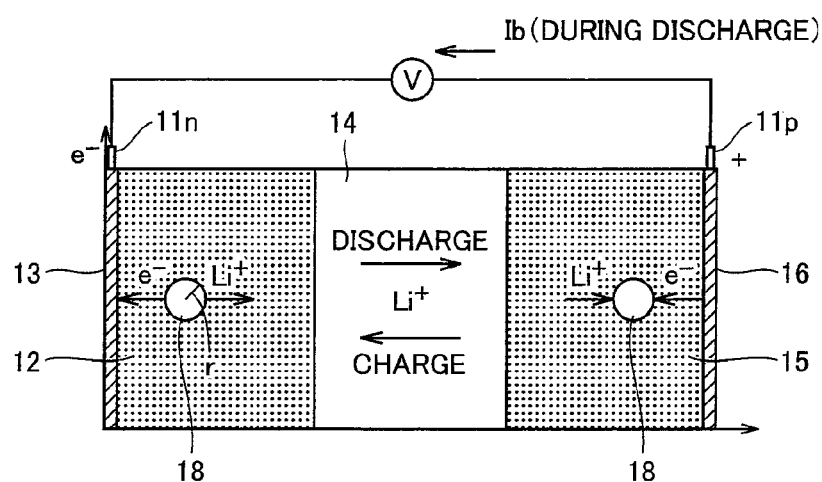
FIG. 2 is a schematic configuration view of the secondary battery.

Referring to FIG. 2, each of battery cells 10# constituting secondary battery 10 includes a negative electrode 12, a separator 14, and a positive electrode 15. Separator 14 is formed by immersing a resin provided between negative electrode 12 and positive electrode 15 in electrolyte.

Each of negative electrode 12 and positive electrode 15 is formed of a collection of spherical active materials 18. On the interface of active material 18 of negative electrode 12, a chemical reaction occurs to emit a lithium ion $Li^+$ and an electron $e^-$. On the other hand, on the interface of active material 18 of positive electrode 15, a chemical reaction occurs to absorb a lithium ion $Li^+$ and an electron $e^-$.

Negative electrode 12 is provided with a current collector 13 absorbing electron $e^-$, and positive electrode 15 is provided with a current collector 16 emitting electron $e^-$. Current collector 13 of the negative electrode is typically formed of copper and current collector 16 of the positive electrode is typically formed of aluminum. Current collector 13 is provided with a negative electrode terminal $11n$ and current collector 16 is provided with a positive electrode collector $11p$. The transport of lithium ion $Li^+$ through separator 14 causes charge/discharge in battery cell 10# to generate charging current Ib ($>0$) or discharging current Ib ($<0$).

Figure 3:
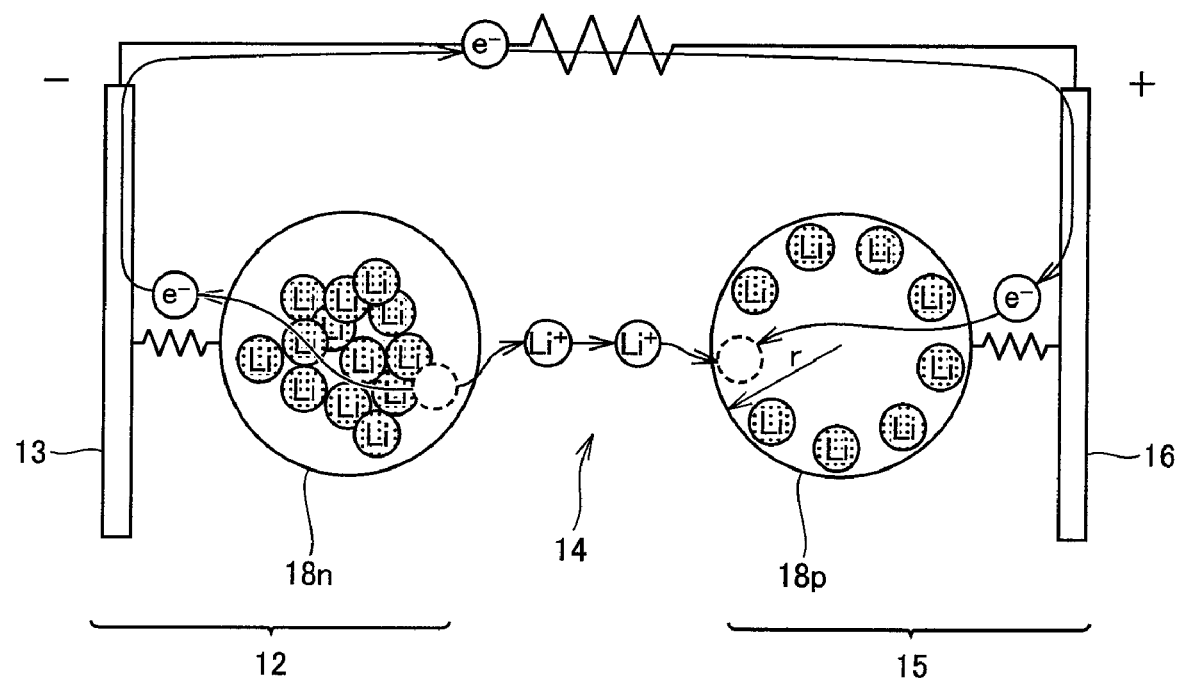
FIG. 3 is a conceptual view illustrating modeling of the secondary battery in a battery model portion.

FIG. 3 is a conceptual diagram illustrating the modeling of the secondary battery in battery model portion 60.

Referring to FIG. 3, in a battery model equation, given that the behavior of lithium ion $Li^+$ in each active material 18 is common in each of negative electrode 12 and positive electrode 15 of each battery cell 10#, it is assumed that one active material $18n$ and one active material $18p$ are representatively provided for negative electrode 12 and positive electrode 15, respectively. Alternatively, for the purpose of alleviating the operational load, the modeling may be performed assuming that the behavior of each battery cell 10# is common. In this case, it is assumed that one active material 18n and one active material 18p are provided in the entire secondary battery 10.

During discharge, by the electrode reaction on the surface of negative electrode active material 18n, lithium atom Li in active material 18n becomes lithium ion Li$^+$ due to emission of electron e$^-$ and is then emitted to the electrolyte in separator 14. On the other hand, in the electrode reaction on the surface of positive electrode active material 18p, the lithium ion Li$^+$ in the electrolyte is taken in and electron e$^-$ is absorbed. Accordingly, lithium atom Li is taken into the interior of positive electrode active material 18p. The emission of lithium ion Li$^+$ from negative electrode active material 18n and take-in of lithium ion Li$^+$ at positive electrode active material 18p causes current to flow from positive electrode current collector 16 to negative electrode current collector 13.

By contrast, during charge of the secondary battery, by the electrode reaction on the surface of negative electrode active material 18n, lithium ion Li$^+$ in the electrolyte is taken in, and in the electrode reaction on the surface of positive electrode active material 18p, lithium ion Li$^+$ is emitted into the electrolyte.

In the battery model equations, the electrode reaction on the surface of active material 18p, 18n during charge/discharge, diffusion (radial direction) of lithium ions in the interior of active material 18p, 18n, diffusion of lithium ions in electrolyte, and the potential distribution at each part are modeled.

In the following, an example of battery model capable of dynamically estimating the internal state of the secondary battery for use in battery model portion 60 will be described. The battery model is configured with battery model equations (M1)-(M15).

FIG. 4 shows a listing of variables and constants used in the battery model equations (M1)-(M15) below. The variables such as battery temperature T (in the interior of the battery), each potential, and a lithium ion concentration shown in FIG. 4 correspond to "state estimation values" in the present invention.

$$j^{Li}/i_n = i_o\left[\exp\left(\frac{\alpha_j F}{RT}\eta\right) - \exp\left(-\frac{\alpha_c F}{RT}\eta\right)\right] \quad (M1)$$

$$\eta = \phi_s - \phi_e - U - j^{Li}/i_n R_f \quad (M2)$$

$$U = U_0 + (T - T_0)\frac{\delta U}{\delta T} \quad (M3)$$

Equations (M1)-(M3) are equations called Butler-Volmer equations, which indicate electrode reaction. In equation (M1), exchange current density $i_0$ is given by a function of a lithium ion concentration at the interface of active material 18 (see Non Patent Document 1 for the details). In equation (M2), the detail of $\eta$ in equation (M1) is shown, and in equation (M3), the detail of U in equation (M2) is shown.

$$\frac{\delta(\varepsilon_e c_e)}{\delta t} = \nabla(D_e^{eff}\Delta c_e) + \frac{1-t_+^0}{F}j^{Li} - \frac{\vec{i}_e \nabla_+^0}{F} \quad (M4)$$

$$D_e^{eff} = \frac{D_e \varepsilon_e}{\tau} \quad (M5)$$

$$j^{Li} = a_s \cdot i_n \quad (M6)$$

Equations (M4)-(M6) show conservation of lithium ion in the electrolyte. Equation (M5) shows the definition of the effective diffusion coefficient in the electrolyte, and equation (M6) shows that reaction current $j^{Li}$ is given by the product of active material surface area $a_s$ per unit volume of the electrode and transport current density/$i_n$ shown in equation (M1). Here, the volume integral for the entire electrode of reaction current $j^{Li}$ corresponds to battery current Ib.

$$\frac{\delta(\varepsilon_s c_s)}{\delta t} = \nabla D_s \nabla c_s \simeq D_s\left[\frac{\delta^2 c_s}{\delta r^2} + \frac{2}{r}\frac{\delta c_s}{\delta r}\right] \quad (M7)$$

$$a_s = \frac{3\varepsilon_s}{r_s} \quad (M8)$$

Equations (M7) and (M8) show conservation of lithium ion in the solid state. Equation (M7) shows the diffusion equation in spherical active material 18, and equation (M8) shows active material surface area $a_s$ per unit volume of the electrode.

$$\nabla(\kappa^{eff} \nabla \phi_e) + \nabla(\kappa_D^{eff} \nabla \ln c_e) + j^{Li} = 0 \quad (M9)$$

$$\kappa^{eff} = \frac{\kappa}{\tau} \quad (M10)$$

$$\kappa_D^{eff} = \frac{2RT\kappa^{eff}}{F}(t_+^0 - 1)\left(1 + \frac{d\ln f_\pm}{d\ln c_e}\right) \quad (M11)$$

In equations (M9)-(M11), the equation indicating a potential in the electrolyte is derived from conservation of charge in the electrolyte.

Equation (M10) shows effective ion conductivity $\kappa^{eff}$, and equation (M11) shows diffusion conductivity coefficient $\kappa_D^{eff}$ in the electrolyte.

$$\nabla(\sigma^{eff}\nabla\phi_s) - j^{Li} = 0 \quad (M12)$$

$$\sigma^{eff} = \varepsilon_s \sigma \quad (M13)$$

Equations (M12) and (M13) show the equations for finding a potential in the solid state by conservation of charge in the active material.

$$\frac{\delta(\rho c_p T)}{\delta t} = \nabla \lambda \nabla T + q \quad (M14)$$

$$q = a_s / i_n\left(\phi_s - \phi_e - U + T\frac{\delta U}{\delta T}\right) + \quad (M15)$$
$$\sigma^{eff}\nabla\phi_s\nabla\phi_s + (\kappa^{eff}\nabla\phi_e\nabla\phi_e + \kappa_D^{eff}\nabla\ln c_e\nabla\phi_e)$$

In equations (M14) and (M15), thermal energy conservation law is expressed. This enables analysis of a local temperature change into the interior of the secondary battery resulting from charge/discharge phenomenon.

It is noted that these battery model equations (M1)-(M15) are based on the aforementioned Non-Patent Document 1, and therefore Non-Patent Document 1 is incorporated herein for the detailed explanation of each model equation.

By sequentially solving the difference equations with the boundary conditions set as appropriate at active materials 18p, 18n and each point in the electrolyte, in the battery model equations of equations (M1)-M15), each variable shown in FIG. 4, namely, the state estimation value of secondary battery 10 is sequentially calculated, so that the temporal change of the battery state reflective of the internal reaction of the secondary battery can be estimated. Here, the lithium ion concentration in each active material 18p, 18n is a function of radius r inside the active material and the lithium ion concentration is uniform in the circumferential direction.

In the aforementioned battery model, SOC is found by the number of lithium atoms in negative electrode active material 18n. Furthermore, estimation of the lithium ion concentration distribution in the interior of active material 18p, 18n enables prediction of the battery state reflective of charge/discharge history in the past. For example, even if the present SOC is the same, the output voltage is relatively less likely to be decreased in a case where the current SOC is achieved by charge, followed by discharge than in a case where the current SOC is achieved by discharge, followed by further discharge. Here, prediction of such phenomenon is possible. Specifically, while the lithium ion concentration in negative electrode active material 18n is relatively high on the surface side immediately after charge, the lithium ion concentration in negative electrode active material 18n is relatively decreased on the surface side during discharge. Thus, the prediction as described above becomes possible, which reflects the lithium ion concentration distribution in the active material.

Figure 5:
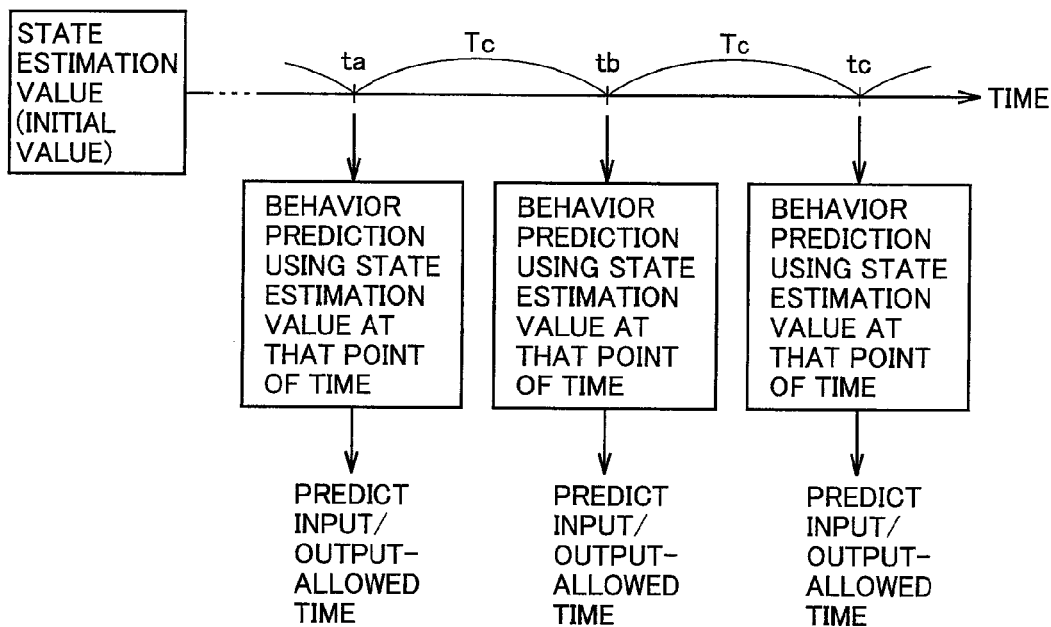
FIG. 5 is a conceptual diagram illustrating an operational timing of the battery model portion and a behavior prediction portion in the charge/discharge control device for a secondary battery in accordance with the first embodiment.

FIG. 5 is a conceptual diagram illustrating an operational timing of the battery model portion and the behavior prediction portion in the charge/discharge control device for a secondary battery in accordance with the first embodiment.

Referring to FIG. 5, battery model portion 60 is operated every prescribed period to sequentially calculate the state estimation value according to the battery model equations described above, based on the detection values from sensors 30, 32, 34. Actually, a difference from the previous estimation calculation is calculated and then the state estimation value is updated. Thus, the state estimation value of the secondary battery is sequentially updated with an initial value as a starting point, based on the detection values from sensors 30, 32, 34 indicating the use status of the secondary battery.

In this manner, while the internal state of the secondary battery is sequentially estimated, a behavior prediction routine is executed by behavior prediction portion 65 every prescribed period Tc. This prescribed period Tc is set to be equal to or longer than an operation period of the battery model portion.

Figure 6:
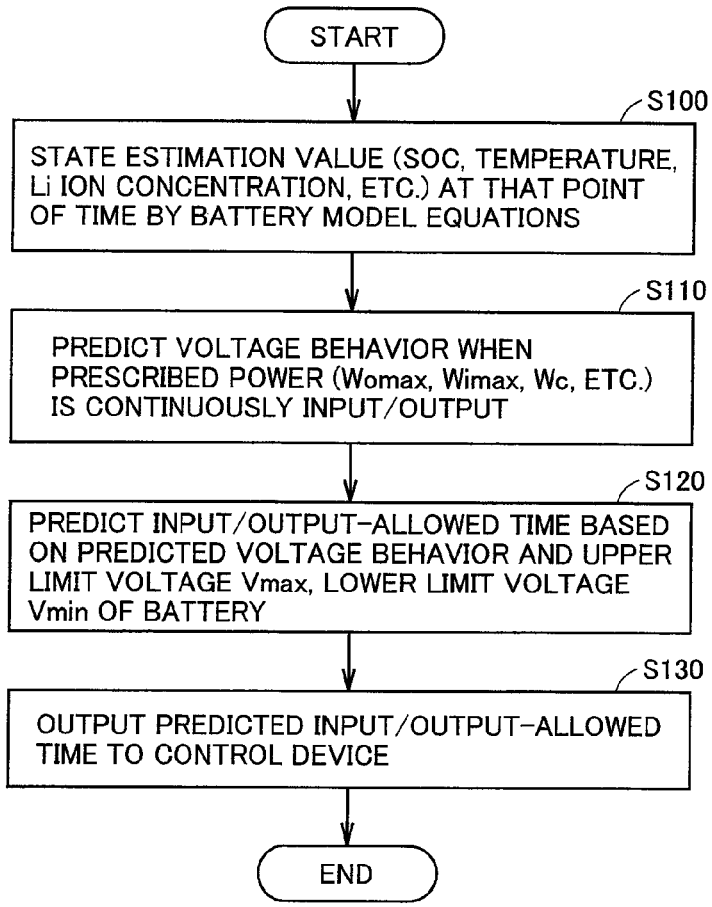
FIG. 6 is a flowchart illustrating a behavior prediction routine executed by the behavior prediction portion during operation in accordance with the first embodiment.

For example, as shown in FIG. 5, at time ta, a state estimation value by battery model portion 60 at that time is used to execute behavior prediction according to the behavior prediction routine shown in FIG. 6. As described above, behavior prediction portion 65 predicts an input/output-allowed time when certain prescribed power is input (charge) or output (discharge) continuously from the present time. Prediction of the input/output-allowed time is executed every prescribed period Tc, in the example in FIG. 5, at time tb after a lapse of Tc since time ta and at time tc after a lapse of further Tc, using the state estimation values by battery model portion 60 at the respective points of time.

FIG. 6 is a flowchart illustrating the behavior prediction routine executed by behavior prediction portion 65 during operation. The flowchart shown in FIG. 6 is realized as a function of behavior prediction portion 65 shown in FIG. 1 by executing a program stored beforehand in battery ECU 50 every prescribed period (Tc).

Referring to FIG. 6, in step S100, behavior prediction portion 65 obtains the state estimation value at that point of time when it is sequentially estimated according to the battery model equations by battery model portion 60. For example, the state estimation value to be considered in step S100 includes SOC, the internal temperature, the lithium ion concentration distribution, the potential distribution at this point of time, and the like. In addition, in step S110, behavior prediction portion 65 predicts the behavior of the battery output voltage at the time when prescribed power is charged or discharged continuously from the present time.

Figure 7:
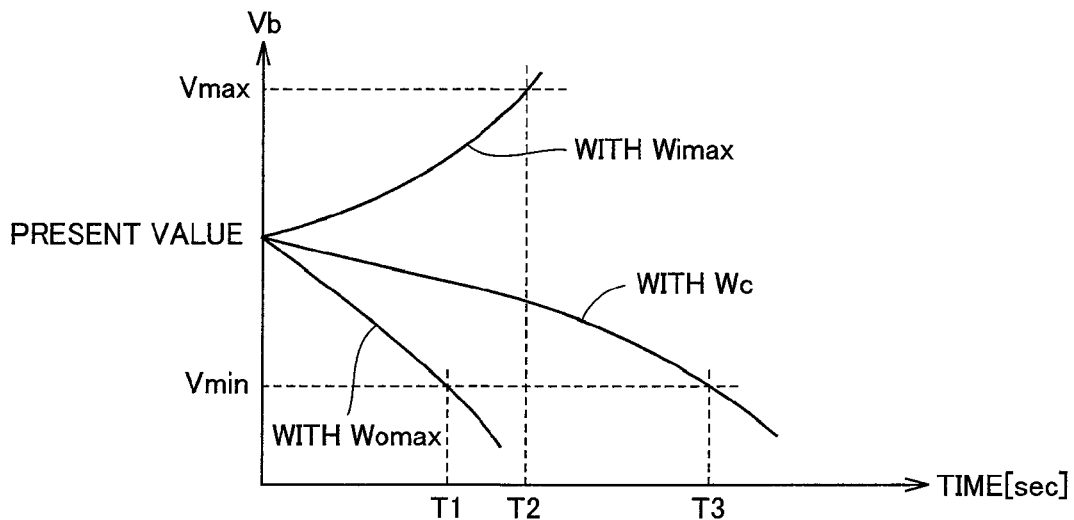
FIG. 7 is a conceptual diagram illustrating the relation between battery output voltage behavior prediction and input/output-allowed time.

As shown in FIG. 7, a prediction value of battery voltage Vb is calculated according to a model created in advance, in the case where charge/discharge is performed continuously from the present time with the maximum output power Womax to the load, the maximum input power Wimax from the load, and the present input/output power Wc. Here, as shown by the dotted line in FIG. 8, which will be described later, for predetermined power (for example, set every 5 kw between the maximum output power Womax and the maximum input power Wimax) other than the aforementioned maximum output power Womax, maximum input power Wimax, and the present input/output power Wc, a prediction value of battery voltage Vb may also be calculated according to the aforementioned model in order to predict the input/output-allowed time.

As for this battery voltage behavior prediction model, for example, a simplified version of the aforementioned battery model equations (M1)-(M15) may be used, considering that the input/output power is constant. Alternatively, a function equation may be defined separately, which predicts the battery voltage behavior (for example, dVb/dt: the battery voltage change amount per unit time) using the state estimation value obtained in step S100 and prescribed power for charge/discharge as variables.

Based on the battery voltage behavior prediction model as described above, when the input/output voltage from secondary battery 10, which is Womax (the maximum output power: discharge), Wimax (the maximum input power: charge) and the present input/output power Wc, is continuously input/output, the time required for battery voltage Vb to reach the lower limit voltage Vmin (during discharge) or to reach the upper limit value Vmax (during charge) is obtained. In this case, the required time to reach T1-T3 is the input/output-allowed time predicted when Womax, Wimax and Wc are input/output from secondary battery 10 continuously from the present time. Here, the upper limit voltage Vmax and the lower limit voltage Vmin are determined according to the highest rated voltage and the lowest rated voltage of secondary battery 10, the operative (guaranteed) voltage of the load, or the like.

In other words, input/output time T1 represents the maximum time during which discharge can be performed with the maximum output power Womax continuously without battery voltage Vb decreasing to the lower limit voltage Vmin, from the present time. Similarly, input/output time T2 represents the maximum time during which charge can be performed continuously with maximum input power Wimax without battery voltage Vb rising to the upper limit voltage Vmax, from the present time. In addition, input/output time T3 represents the maximum time during which charge/discharge of secondary battery 10 with the present input/output power can be continued from the present time with battery voltage Vb kept within the range from the upper limit voltage Vmax to the lower limit voltage Vmin. In this way, behavior prediction portion 65 can predict the input/output-allowed time with respect to prescribed input/output power, at each point of time.

Figure 8:
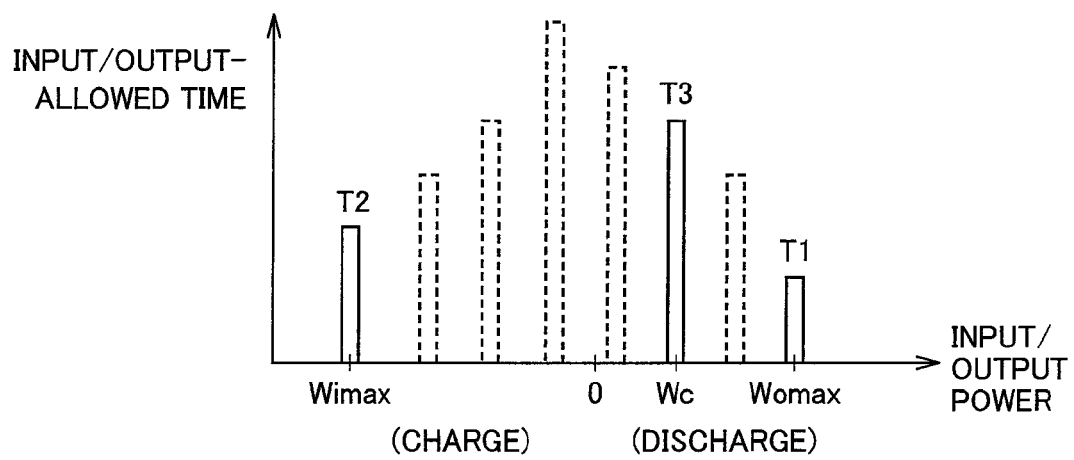
FIG. 8 is a conceptual diagram showing an exemplary structure of prediction information for use in the charge/discharge control device for a secondary battery in accordance with the first embodiment.

In particular, as shown in FIG. 8, for the maximum output power Womax, the maximum input power Wimax and the present input/output power Wc, or prescribed power in multiple cases including any other prescribed power (for example, set every 5 kw between the maximum output power Womax and the maximum input power Wimax), the respective input/output-allowed times are predicted, so that the input/output power-input/output-allowed time characteristic can be obtained in the map format.

Referring to FIG. 6 again, behavior prediction portion 65 predicts the input/output-allowed time by comparison between the battery voltage behavior prediction shown in FIG. 7 and the upper limit voltage Vmax and the lower limit voltage Vmin, in step S120. Then, behavior prediction portion 65 obtains the characteristics of input/output power and input/output-allowed time as shown in FIG. 8 and outputs the same as prediction information to control device 70, in step S130.

In control device 70, in response to an operation request to load 20, in consideration of characteristics of the input/output power and input/output-allowed time obtained by behavior prediction portion 65, an operation command for load 20 is generated such that charge/discharge of secondary battery 10 is restricted within the range in which overcharge or overdischarge of the secondary battery is avoided. In particular, by using information indicative of the continuous input/output-allowed time with respect to charging/discharging power, rather than merely the outputtable power from secondary battery 10 (discharging power upper limit value) Wout and the inputtable power (charging power upper limit value) Win, it can be expected that such charge/discharge restriction becomes possible in that overcharge and overdischarge are avoided in a foreseeable manner and the battery performance is maximized. Moreover, in addition to avoiding overdischarge and overcharge, the output power from secondary battery 10 is reduced in advance when the continuous input/output-allowed time is short, thereby achieving improved driving comfortability as a result of avoiding shocks during travel and improved fuel efficiency. On the contrary, the output power from secondary battery 10 is increased when the input/output-allowed time is long, thereby achieving improved fuel efficiency.

As explained above, in the charge/discharge control device for a secondary battery in accordance with the first embodiment, on the basis of estimation of the battery state using the battery model equations capable of dynamically estimating the internal state of a secondary battery, the input/output-allowed time for prescribed power can be predicted every prescribed period. Furthermore, since this behavior prediction is reflected in generating the operation command for load 20 for receiving/supplying power from/to secondary battery 10, such charge/discharge restriction becomes possible in that overcharge/overdischarge of secondary battery 10 can be avoided reliably.

In addition, the input/output-allowed time is predicted for the input/output power at multiple stages and is reflected in the operation command for load 20, so that step-by-step charge/discharge restriction can be performed, as compared with the control configuration in which only the upper limit value of charging/discharging power is simply set, and the secondary battery can be used in such a manner that the battery performance at that point of time can be maximized while overcharge and overdischarge are avoided.

It is noted that in the first embodiment, battery model portion 60 in FIG. 1 corresponds to "battery state estimation portion" in the present invention, behavior prediction portion 65 in FIG. 1 corresponds to "input/output-allowed prediction portion" in the present invention, and control device 70 corresponds to "load control portion" in the present invention. Furthermore, step S110 in FIG. 6 corresponds to "voltage transition prediction portion" in the present invention and step S120 corresponds to "time prediction portion" in the present invention.

Second Embodiment

In the second embodiment, a description will be given to a configuration in which, in the control configuration shown in FIG. 1, a deterioration degree for the charge/discharge conditions at that point of time is evaluated by the behavior prediction portion thereby restricting charge/discharge of a secondary battery.

Figure 9:
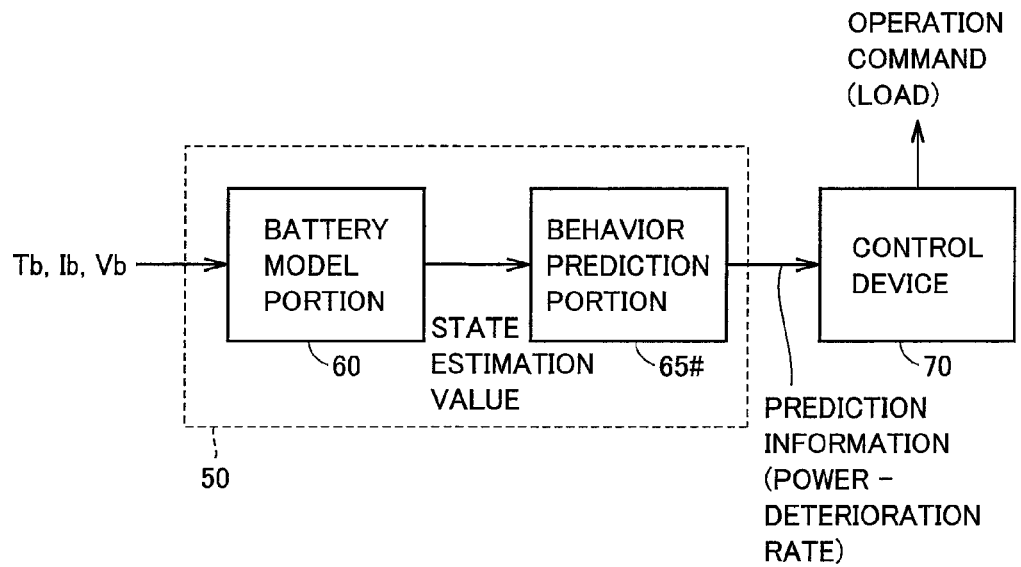
FIG. 9 is a schematic block diagram illustrating a functional configuration of the charge/discharge control device for a secondary battery in accordance with the second embodiment.

FIG. 9 is a schematic block diagram illustrating a functional configuration of the charge/discharge control device for a secondary battery in accordance with the second embodiment.

Referring to FIG. 9, in the second embodiment, battery ECU 50 includes battery model portion 60 similar to that of the first embodiment and a behavior prediction portion 65#. Battery model portion 60 dynamically estimates the internal state of secondary battery 10 to sequentially update the state estimation value, similarly to the first embodiment.

Behavior prediction portion 65# evaluates a deterioration rate in a case where secondary battery 10 is continuously charged/discharged with prescribed power, by a prescribed prediction operation using the state estimation value calculated by battery model portion 60. Then, the characteristics of input/output power and deterioration rate is output as prediction information to control device 70. Control device 70 generates an operation command for load 20 in consideration of the prediction information (the input/output power-deterioration rate characteristic) from behavior prediction portion 65#. It is noted that the deterioration rate is a parameter indicating the progress degree of battery deterioration per unit time, and the greater deterioration, rate indicates that battery deterioration is more likely to proceed.

Figure 10:
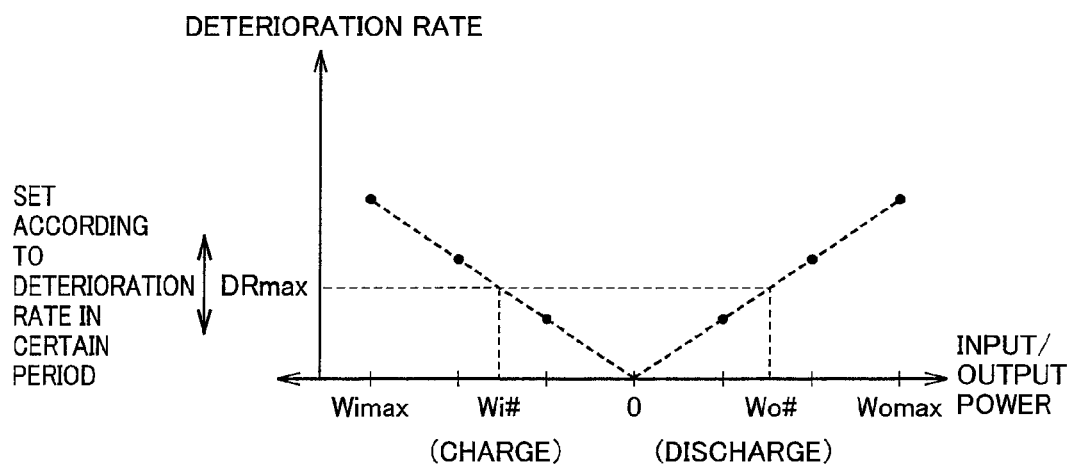
FIG. 10 is a conceptual diagram showing an exemplary structure of prediction information and charge/discharge restriction for use in the charge/discharge control device for a secondary battery in accordance with the second embodiment.

For example, as shown in FIG. 10, behavior prediction portion 65# finds a predicted deterioration rate in inputting/outputting prescribed power in multiple cases, in the present battery state, within a range from the maximum output power Womax to the maximum input power Wimax. The model equation for predicting a deterioration rate is set in which at least battery temperature T, input/output power Ib, of the state estimation values by battery model portion 60 at that point of time, are reflected. This model equation can be set arbitrarily and therefore the detailed description thereof will be omitted.

Behavior prediction portion 65# executes a behavior prediction routine (not shown) for finding the aforementioned prediction information (the input/output power-deterioration rate characteristic) every prescribed period, in a manner similar to behavior prediction portion 65 of the first embodiment.

Figure 11:
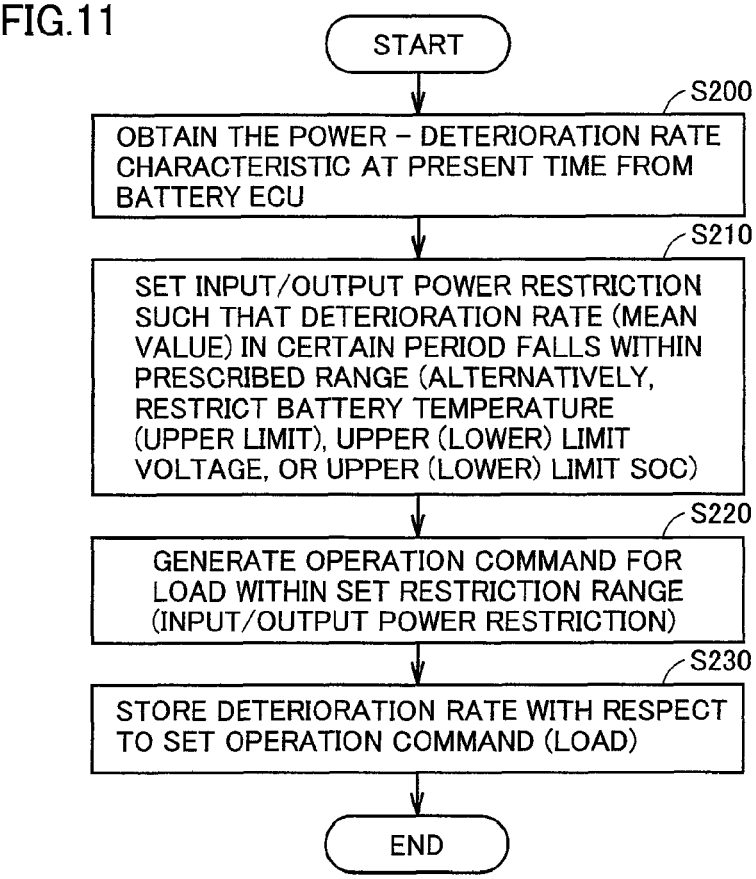
FIG. 11 is a flowchart illustrating the secondary battery charge/discharge control in accordance with the second embodiment.

FIG. 11 is a flowchart illustrating charge/discharge control of secondary battery 10 in accordance with the second embodiment. Charge/discharge control in accordance with the second embodiment is mainly directed to generation of the operation command by control device 70, which reflects the deterioration rate prediction by battery ECU 50.

Referring to FIG. 11, control device 70 obtains the charge/discharge conditions (input/output power)—predicted deterioration rate characteristic at present from battery ECU 50, in step S200. Then, control device 70 calculates the upper limit deterioration rate DRmax permissible at the present time such that the integrated value or the mean value of deterioration rates within a certain period falls within a prescribed range, in step S210. For example, in a case where a battery operation continues so far under the condition of a great deterioration degree, the upper limit deterioration rate DRmax is set to a relatively low value in order to restrict rapid progress of battery deterioration. Then, control device 70 performs charge/discharge restriction according to the calculated upper limit deterioration rate DRmax. For example, charge/discharge is restricted by restriction on input/output power or by restriction on the battery temperature (upper limit), the upper (lower) limit voltage or the upper (lower) limit SOC.

Referring to FIG. 10 again, according to the calculated upper limit deterioration rate DRmax and the input/output power—predicted deterioration rate characteristic by behavior prediction portion 65#, the upper limit output power Wo# and the upper limit input power Wi# at the time when the deterioration rate predicted based on the battery state at the present time reaches the upper limit deterioration rate DRmax are obtained.

Referring to FIG. 11 again, in step S220, control device 70 performs charge/discharge restriction by putting restrictions within the charge/discharge restriction range set in step S210, for example, by restricting the input/output power range with Wi# set as the upper limit for charge and with Wo# set as the upper limit for discharge, and then generates an operation command for load 20. Furthermore, in step S230, control device 70 obtains and stores the predicted deterioration rate corresponding to the operation command for load 20 set in step S220, based on the prediction information shown in FIG. 10. Accordingly, evaluation of the deterioration rate (the integrated value or the mean value) for a certain period in the next operation is updated.

Because of such a configuration, according to the charge/discharge control device for a secondary battery in accordance with the second embodiment, the deterioration degree for the use power (input/output power) at each point of time is sequentially predicted based on the internal state estimation of the secondary battery according to the battery model, and then charge/discharge control can be performed with restrictions within such a range in that deterioration of secondary battery 10 does not significantly proceed.

It is noted that the first and second embodiments may be combined to perform charge/discharge control of secondary battery 10, in which both of the input/output-allowed time and the deterioration rate for the input/output power are output as prediction information from battery ECU 50 to control device 70. In this case, in consideration of both of the input/output-allowed time and the deterioration rate, the operation command for load 20 is generated by control device 70 such that overcharge and overdischarge and rapid deterioration progress of secondary battery 10 are avoided.

Modification of Second Embodiment

Figure 12:
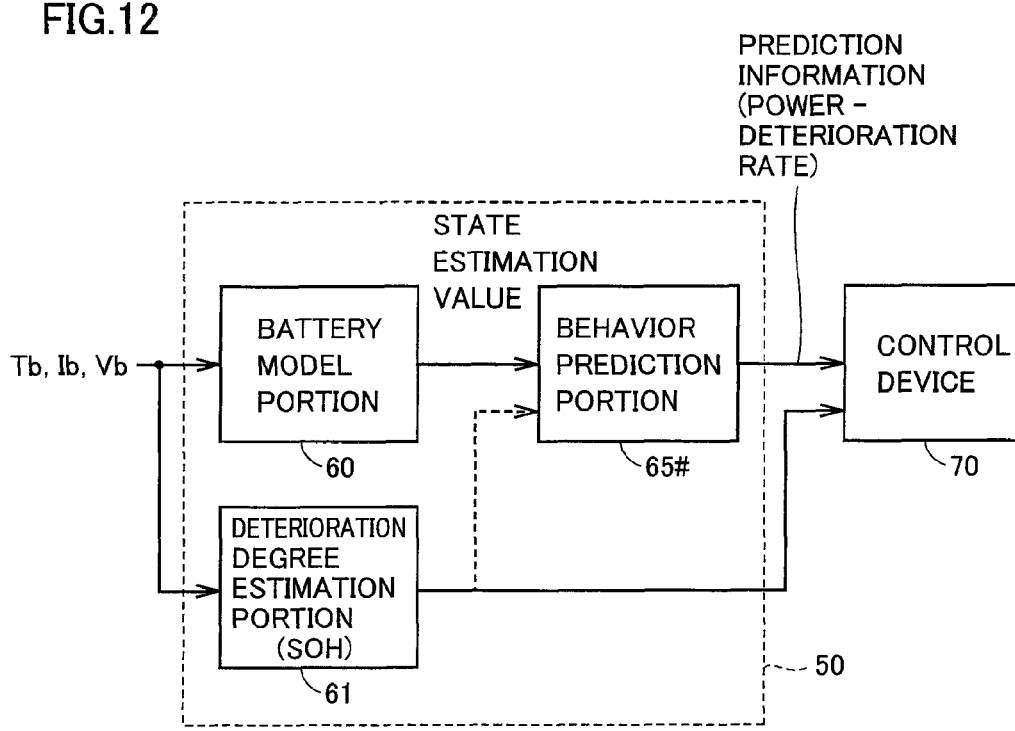
FIG. 12 is a schematic block diagram illustrating a functional configuration of the charge/discharge control device for a secondary battery in accordance with a modification of the second embodiment.

FIG. 12 is a block diagram illustrating a functional configuration of the charge/discharge control device for a secondary battery in accordance with a modification of the second embodiment.

Referring to FIG. 12, in the third embodiment, battery ECU 50 further includes a deterioration degree estimation portion 61 in addition to battery model portion 60 and behavior prediction portion 65# similar to those of FIG. 9.

Deterioration degree estimation portion 61 has a function of estimating a deterioration state of a battery (SOH: State of Health), so to speak, and estimates a deterioration degree and/or remaining lifetime of secondary battery 10, based on the detection values Tp, Ib, Vb by sensors 30, 32, 34. The deterioration degree and/or the remaining lifetime of secondary battery 10 as estimated by deterioration degree estimation portion 61 is output to control device 70 (or also to behavior prediction portion 65#).

Here, using FIG. 13-FIG. 15, an example of secondary battery 10 deterioration degree estimation technique will be described.

For example, deterioration degree estimation portion 61 is configured to be able to identify a part of parameters (constants) for use in the battery model, based on the secondary battery behavior in a diagnostic mode operation.

Figure 13:
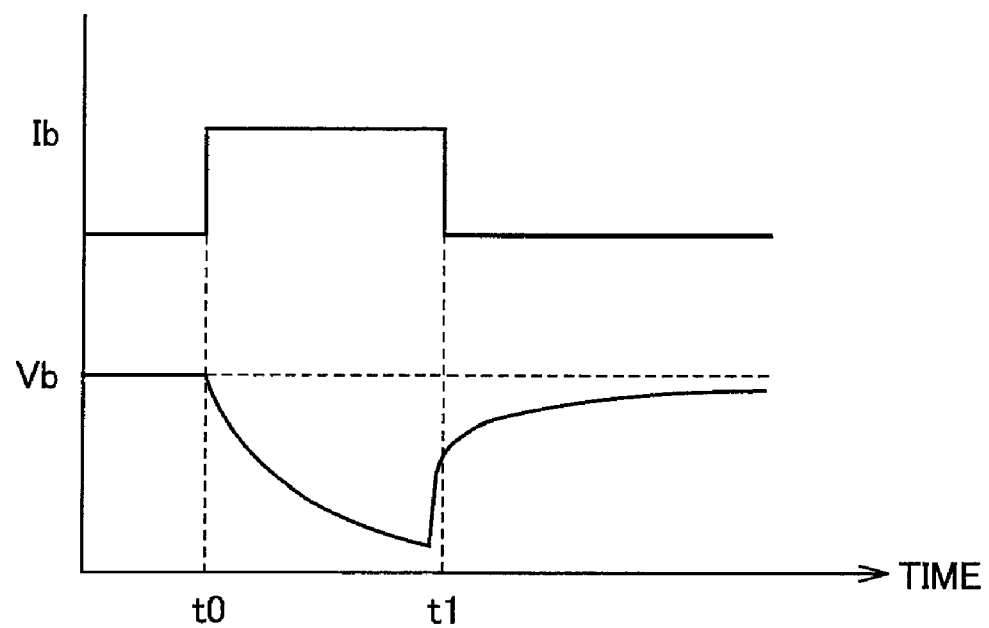
FIG. 13 is a waveform diagram illustrating a secondary battery operation in a diagnostic mode for deterioration degree estimation.

Referring to FIG. 13, in the diagnostic mode, a diagnosis operation is performed in such a manner that secondary battery 10 outputs constant current in a pulse form from time t0 to t2. By this diagnosis operation, battery voltage Vb gradually recovers after cut-off of pulse current (namely, after time t2), according to output of pulse-like current. Such voltage behavior is sensed by voltage sensor 34, and battery voltage Vb is input to deterioration degree estimation portion 61. It is noted that such a diagnostic mode is preferably performed after a prescribed time (about 30 minutes) has passed since the termination of use of the secondary battery and the internal state of the secondary battery has become statistic.

For example, exchange current density $i_0$ can be estimated based on the voltage behavior at a time of pulse-like current output. Furthermore, diffusion coefficient $D_s$ at the positive electrode can be estimated based on the voltage behavior after cut-off of pulse current. The parameters (referred to as deterioration management parameters X, Y hereinafter) to be identified and the number thereof may be determined arbitrarily.

Figure 14:
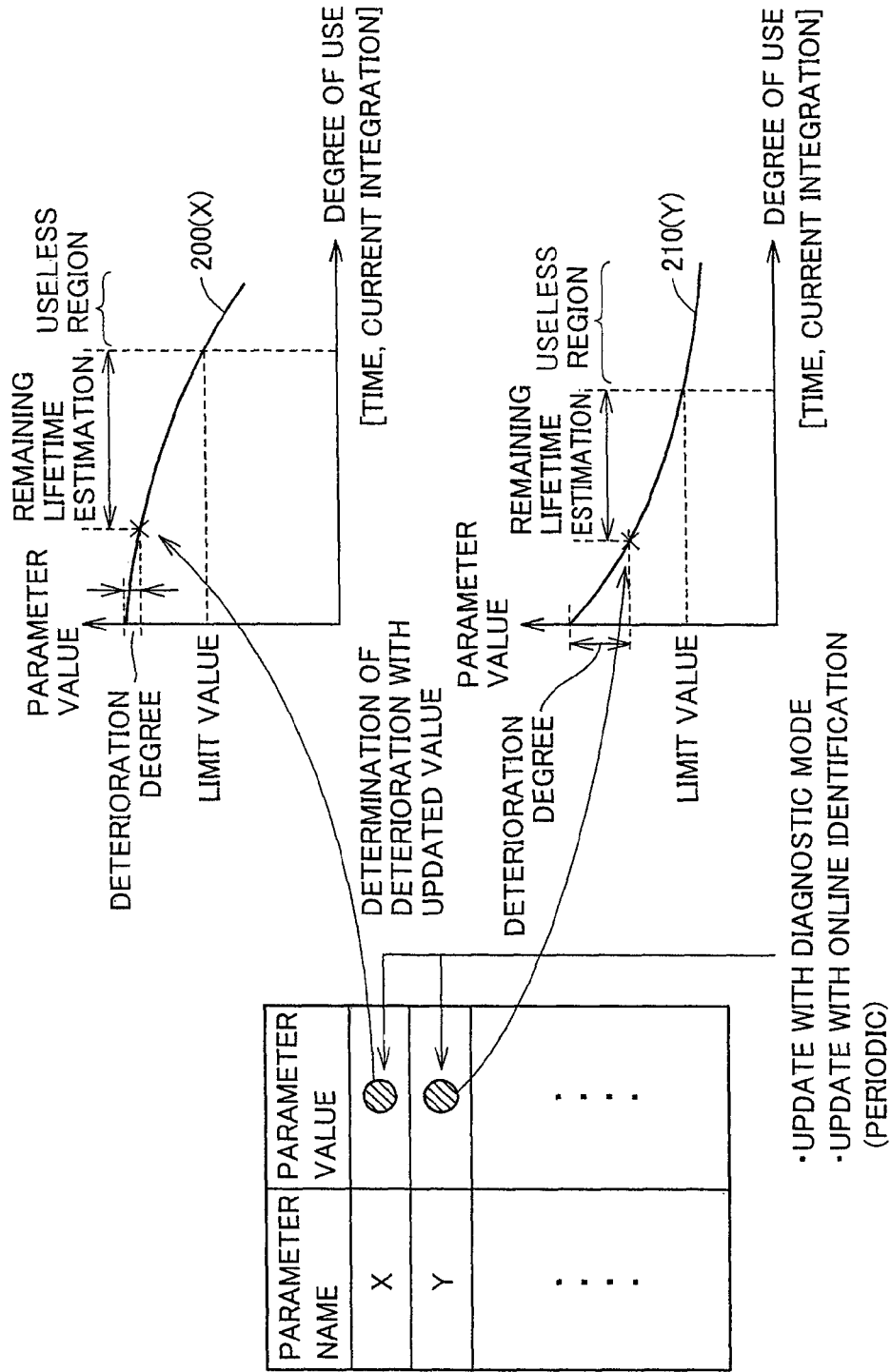
FIG. 14 is a conceptual diagram illustrating an operation of a deterioration degree estimation portion shown in FIG. 12.
Figure 15:
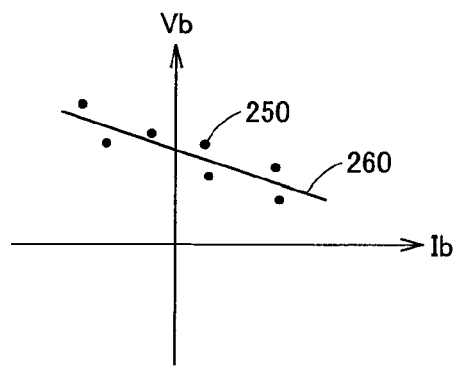
FIG. 15 is a conceptual diagram showing an example of online identification of a deterioration management parameter.

Referring to FIG. 14, deterioration degree estimation portion 61 identifies parameter values at present for deterioration management parameters X, Y during execution of the aforementioned diagnostic mode. For deterioration management parameters X, Y, a change of the parameter value corresponding to the degree of use of the secondary battery, namely, the deterioration characteristic is obtained in advance. For example, a use period (time) or a charge/discharge current integrated value is used as the use degree of the secondary battery. In particular, in a case where the secondary battery subjected to charge/discharge control in accordance with the present invention is mounted on a vehicle such as a hybrid vehicle, a travel distance or a use period can be used as the degree of use of the battery.

As shown in FIG. 14, a deterioration characteristic line 200 is obtained in advance with respect to deterioration management parameter X, and a deterioration characteristic line 210 is obtained in advance for deterioration management parameter Y. Deterioration degree estimation portion 61 can estimate the deterioration degree of secondary battery 10 at the present time, for the parameter values at the present time found in the foregoing manner, according to a change amount from an initial value and a margin from the limit value. When a plurality of deterioration management parameters are used, a macroscopic deterioration degree of secondary battery 10 as a whole can be estimated by finding the mean value, the maximum value, the minimum value, or the like of the deterioration degree for each parameter.

Furthermore, if the parameter value changes (decreases or increases) beyond the limit value, it can be determined that it is an useless region, and therefore deterioration degree estimation portion 61 can estimate the remaining lifetime of secondary battery 10 based on the difference between the parameter value at the present time and the above-noted limit value.

Alternatively, deterioration degree estimation portion 61 may be configured to operate in parallel with battery model portion 60 to identify the deterioration management parameter online, based on the online detection values (Tb, current Ib, voltage Vb) detected by sensors 30-34 during use of secondary battery 10, without execution of the diagnostic mode as shown in FIG. 13.

Such online parameter identification is enabled according to the kind of deterioration management parameter. For example, as shown in FIG. 15, by finding the slope of Vb with respect to Ib based on a set of online characteristic points 250 obtained by plotting the relation between battery current Ib and battery voltage Vb, interface direct-current resistance R in the battery model equations can be identified and set as a deterioration management parameter.

Next, using FIG. 16 and FIG. 17, charge/discharge control of a secondary battery in accordance with the modification of the second embodiment will be described.

Figure 16:
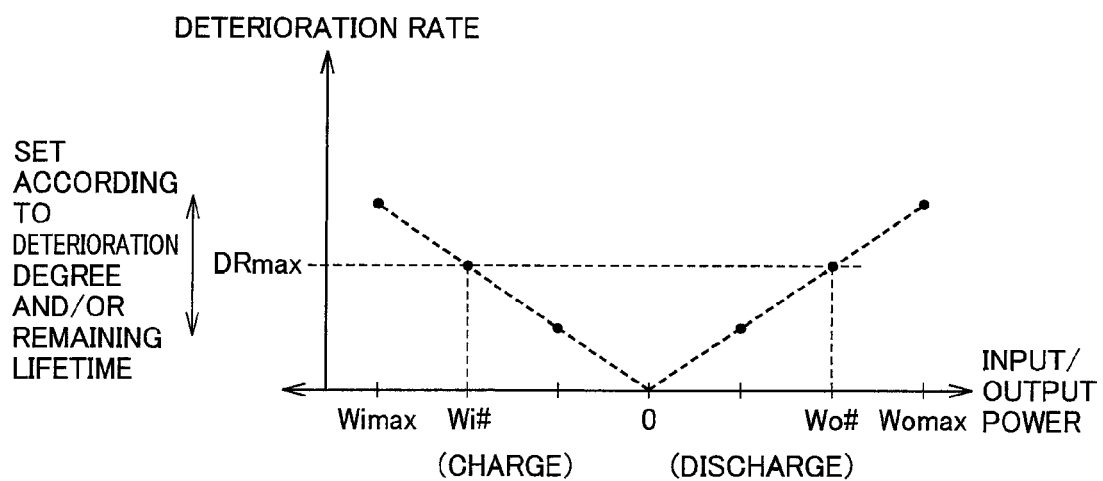
FIG. 16 is a conceptual diagram showing an exemplary structure of prediction information and charge/discharge restriction for use in the charge/discharge control device for a secondary battery in accordance with the modification of the second embodiment.

Referring to FIG. 16, behavior prediction portion 65# predicts a deterioration rate of secondary battery 10 for the input/output power based on the internal state of the secondary battery at this point of time and outputs the input/output power-deterioration rate characteristic as prediction information to control device 70, in a similar manner as shown in FIG. 10.

In the modification of the second embodiment, control device 70 sets the upper limit deterioration rate DRmax permissible at the present time according to the deterioration degree and/or remaining lifetime estimated by deterioration degree estimation portion 61. For example, with the greater deterioration degree, with the shorter remaining lifetime, the upper limit deterioration rate DRmax is set to a relatively lower value.

In this manner, the upper limit output power Wo# and input power Wi# at the time when the deterioration rate reaches the upper limit deterioration rate DRmax are found based on the prediction information (the dotted line in FIG. 16) found by behavior prediction portion 65#. Then, control device 70 generates an operation command for load 20 with restrictions within a range with Wi# set as the upper limit for charge and with Wo# set as the upper limit for discharge.

Figure 17:
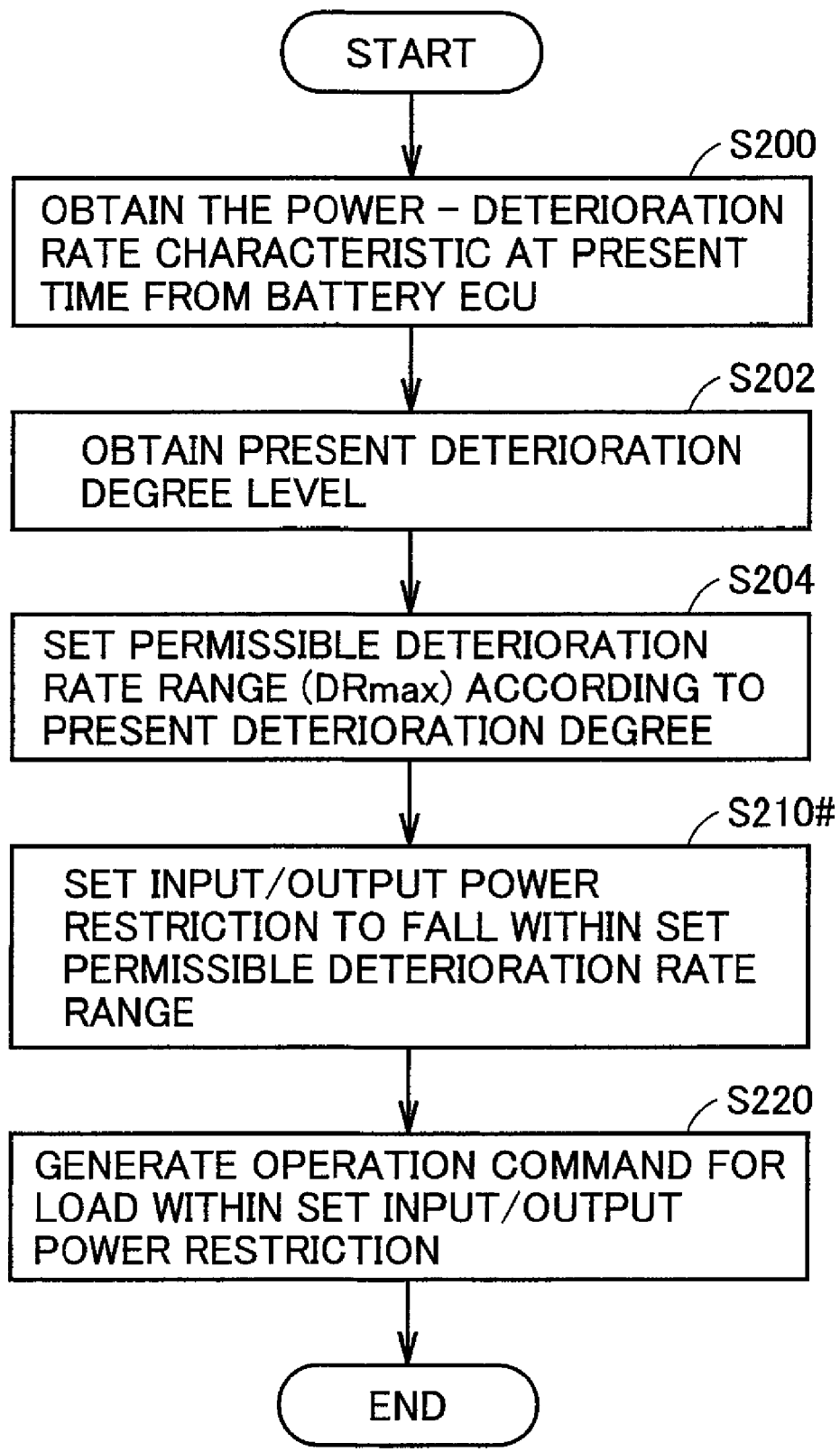
FIG. 17 is a flowchart illustrating the secondary battery charge/discharge control in accordance with the modification of the second embodiment.

Referring to FIG. 17, in step S200, control device 70 obtains the charge/discharge condition (input/output power) predicted deterioration rate characteristic at present, from battery ECU 50. Then, control device 70 obtains the deterioration degree and/or remaining lifetime estimated by deterioration degree estimation portion 61, in step S202, and in addition, sets the permissible deterioration rate range (namely, the upper limit deterioration rate DRmax) according to the present deterioration degree and/or remaining lifetime, in step S204.

Then, in step S210#, control device 70 sets the input/output power restriction according to the permissible deterioration rate range set in step S204. Specifically, as shown in FIG. 16, according to the upper limit deterioration rate DRmax set according to the deterioration degree and/or remaining lifetime at the present time and the input/output power—predicted deterioration rate characteristic by behavior prediction portion 65#, the upper limit output power Wo# and the upper limit input power Wi# at the time when the deterioration rate predicted based on the battery state at the present time reaches the upper limit deterioration rate DRmax are obtained. It is noted that such setting of input/output power restriction may be executed in behavior prediction portion 65# and the upper limit output power Wo# and the upper limit input power Wi# may be included in the prediction information and sequentially sent from behavior prediction portion 65# to control device 70.

In step S220, control device 70 puts restrictions within the input/output power range set in step S210#, more specifically, performs charge/discharge restriction with Wi# set as the upper limit for charge and with Wo# set as the upper limit for discharge and then generates an operation command for load 20.

Because of such a configuration, in the charge/discharge control device for a secondary battery in accordance with the modification of the second embodiment, in addition to the effect brought by the second embodiment, the deterioration rate permissible at each point of time can be set according to the predicted deterioration degree and/or the estimated remaining lifetime at that point of time. Thus, the charge/discharge restriction range is set appropriately according to the deterioration state of the secondary battery, thereby further preventing significant deterioration of the secondary battery and prolonging the lifetime.

It is noted that the first embodiment and the modification of the second embodiment may be combined to perform charge/discharge control of secondary battery 10, in which both of the input/output-allowed time for the input/output power and the deterioration rate are used as prediction information and, in addition, the prediction deterioration degree and/or the estimated remaining lifetime is taken into consideration. In this case also, in consideration of both of the input/output-allowed time and the deterioration degree and the deterioration rate, an operation command for load 20 is generated by control device 70 such that overcharge and overdischarge of secondary battery 10 and the shortened battery lifetime resulting from a rapid deterioration progress are avoided.

It is noted that in the second embodiment and the modification thereof, battery model portion 60 in FIGS. 9, 12 corresponds to "battery state estimation portion" in the present invention, behavior prediction portion 65# in FIGS. 9, 12 corresponds to "deterioration rate prediction portion" in the present invention, and control device 70 corresponds to "load control portion" in the present invention. Furthermore, deterioration degree estimation portion 61 in FIG. 12 corresponds to "deterioration degree estimation portion" in the present invention.

Third Embodiment

In the third embodiment, a description will be given to the application of the charge/discharge control device for a secondary battery in accordance with the first and second embodiments and the modification thereof as described above to a hybrid vehicle.

Figure 18:
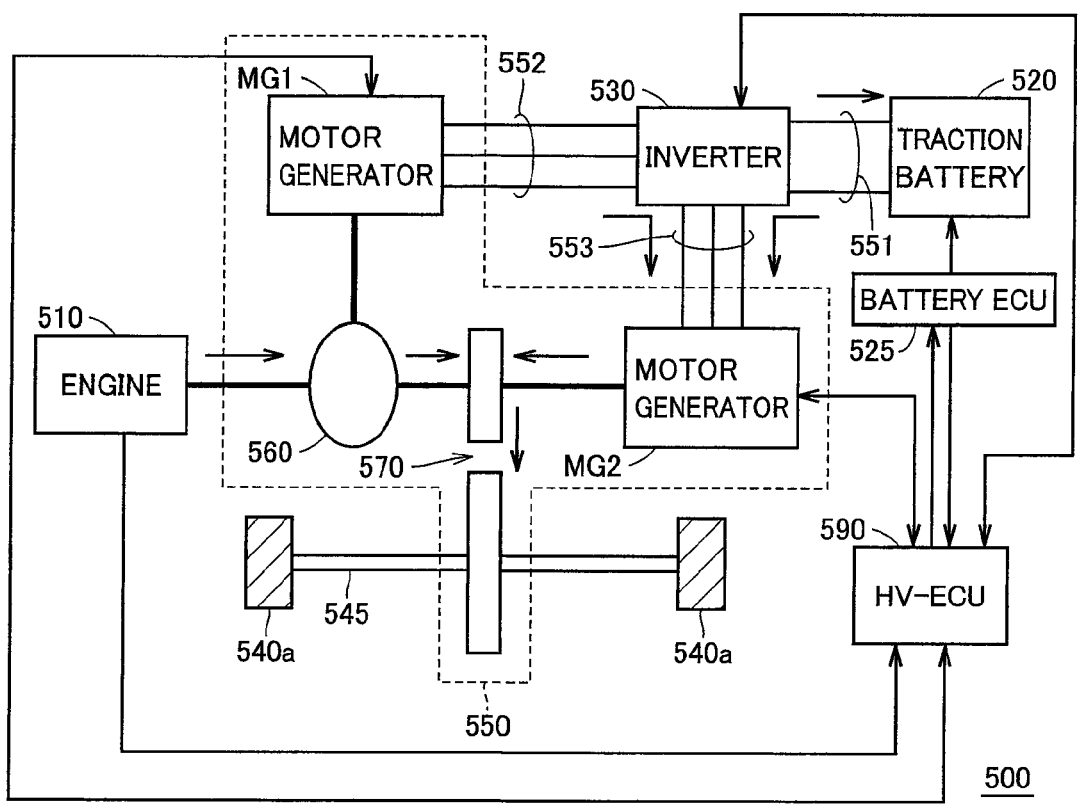
FIG. 18 is a block diagram illustrating an exemplary configuration of a hybrid vehicle in accordance with the third embodiment of the present invention.

FIG. 18 is a block diagram illustrating an exemplary configuration of a hybrid vehicle in accordance with the third embodiment of the present invention.

Referring to FIG. 18, a hybrid vehicle 500 includes an engine 510, a traction battery 520, a battery ECU 525, an inverter 530, wheels 540a, a transaxle 550, and an electronic control unit (HV-ECU) 590 controlling the entire operation of hybrid vehicle 500.

In hybrid vehicle 500 shown in FIG. 18, traction battery 520 and battery ECU 525 respectively correspond to secondary battery 10 and battery ECU 50 (FIG. 1) in the first and second embodiments and the modification of the second embodiment, and HV-ECU 590 corresponds to control device 70 (FIG. 1) in the first and second embodiments and the modification of the second embodiment. Furthermore, motor generators MG1 and MG2 correspond to load 20 (FIG. 1) in the first and second embodiments and the modification of the second embodiment. Motor generator MG2 for vehicle driving power generation mainly serves as a load performing input/output of electric power for traction battery 520.

Engine 510 generates a driving power using combustion energy of fuel such as gasoline as a source. Traction battery 520 supplies direct-current power to a power line 551. Traction battery 520 is typically formed of a lithium-ion secondary battery and the charge/discharge thereof is controlled by the charge/discharge control device for a secondary battery in accordance with the embodiments of the present invention.

Inverter 530 converts the direct-current power supplied from traction battery 520 into alternating-current power, which is then output to a power line 553. Alternatively, inverter 530 converts alternating-current power supplied to power lines 552, 553 into direct-current power, which is then output to power line 551.

Transaxle 550 includes a transmission and an axle as an integrated structure and has a power split mechanism 560, a speed reducer 570, motor generator MG1, and motor generator MG2. Power split mechanism 560 can divide the driving power generated by engine 510 into a transmission path to a drive shaft 545 for driving wheels 540a through speed reducer 570 and a transmission path to motor generator MG1.

Motor generator MG1 is rotated by the driving power from engine 510 transmitted through power split mechanism 560 to generate electric power. The generated electric power by motor generator MG1 is supplied to inverter 530 through power line 552 and used as charging current for traction battery 520 or driving power of motor generator MG2.

Motor generator MG2 is rotated and driven by the alternating-current power supplied from inverter 530 to power line 553. The driving power generated by motor generator MG2 is transmitted to drive shaft 545 through speed reducer 570. Furthermore, in a case where motor generator MG2 is rotated along with deceleration of wheels 540a during regenerative braking operation, electromotive force (alternating-current power) created in motor generator MG2 is supplied to power line 553. In this case, inverter 530 converts the alternating-current power supplied to power line 553 into direct-current power for output to power line 551, thereby charging traction battery 520.

Although each of motor generators MG, MG2 may function as a generator and as a motor, motor generator MG1 often operates as a generator in general, and motor generator MG2 often operates mainly as a motor. HV-ECU 590 controls the entire operation of the equipment and circuitry installed on the vehicle in order to allow hybrid vehicle 500 to be driven according to an instruction by the driver.

As described above, in hybrid vehicle 500, with a combination of the driving power generated by engine 510 and the driving power generated by motor generator MG2 using the electric energy from traction battery 520 as a source, vehicle operation is performed with improved fuel efficiency.

For example, at start-up and at the time of low load during low-speed travel or during descent on a gentle slope, hybrid vehicle 500 runs only with the driving power by motor generator MG2 basically without starting the engine, in order to avoid a region in which an engine efficiency is bad.

During normal travel, the driving power output from engine 510 is split into a driving power for wheels 540a and a driving power for electric power generation at motor generator MG1 by power split mechanism 560. The generated electric power by motor generator MG1 is used for driving motor generator MG2. Therefore, during normal travel, wheels 540a are driven with the driving power by engine 510 with the assistance of the driving power by motor generator MG2. ECU 590 controls the proportion of driving power sharing between engine 510 and motor generator MG2.

During full throttle acceleration, supply power from traction battery 520 is further used to drive the second motor generator MG2, thereby further increasing the driving power for wheels 540a.

During deceleration and braking, motor generator MG2 generates a torque in the opposite direction to rotation of wheels 540a thereby to function as a generator performing regenerative power generation. Electric power recovered by regenerative power generation of motor generator MG2 is used to charge traction battery 520 through power line 553, inverter 530, and power line 551. Furthermore, at vehicle stop, engine 510 is automatically stopped.

In this way, distribution between engine 510 and motor generator MG2 for a required driving power for the entire vehicle is determined depending on the drive situation. Specifically, HV-ECU 590 determines the above-noted distribution according to the drive situation, in consideration of the efficiency of engine 510 in terms of fuel efficiency.

Figure 19:
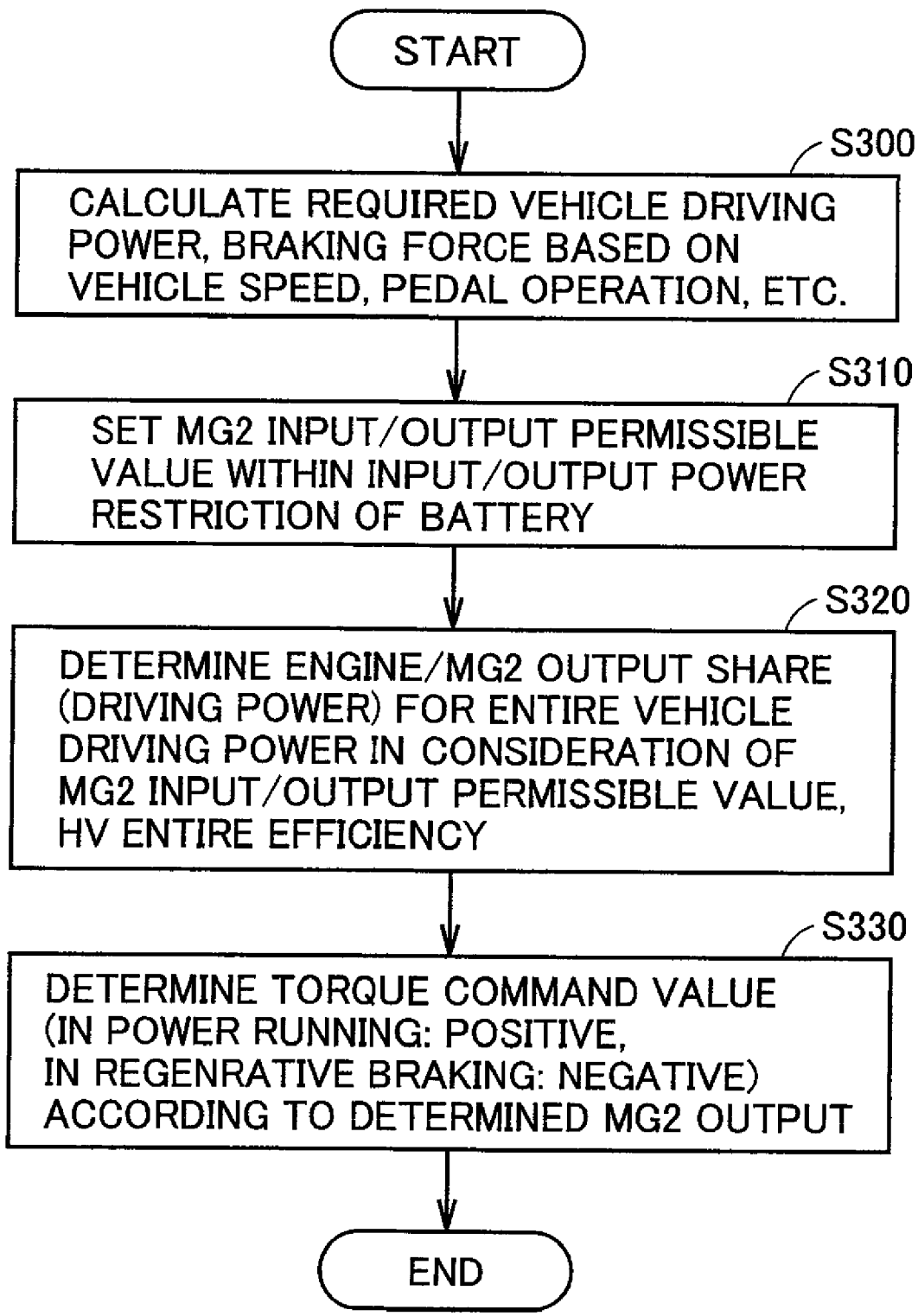
FIG. 19 is a flowchart illustrating operational command value setting for a motor generator MG2 in a hybrid vehicle in which the secondary battery charge/discharge control in accordance with the embodiment is reflected.

FIG. 19 is a flowchart illustrating operation command value setting for motor generator MG2 in hybrid vehicle 500, which reflects charge/discharge control of a secondary battery in accordance with the present embodiment. The flowchart shown in FIG. 19 is realized by executing a program stored beforehand in HV-ECU 590 every prescribed period.

Referring to FIG. 19, in step S300, HV-ECU 590 calculates a vehicle driving power and a vehicle braking power required for the entire vehicle, depending on the present vehicle speed and a pedal operation by the driver.

In step S310, HV-ECU 590 sets an input/output permissible value (electric power) of motor generator MG2, corresponding to charge/discharge restriction of traction battery 520 (secondary battery 10) set in accordance with the first and second embodiments and the modification of the second embodiment.

In addition, HV-ECU 590 determines a driving power output share between engine 510 and motor generator MG2, considering the input/output permissible value of MG2 set in step S310 and the efficiency of hybrid vehicle 500 on the whole, specifically, while giving consideration so that the operation region of engine 510 is an efficient one (step S320). This avoids such an operation of motor generator MG2 in that traction battery 520 is overcharged or overdischarged (specifically, a power running operation to generate a vehicle driving power or a regenerative braking operation for electric power generation).

Then, in step S330, HV-ECU 590 determines a torque command value for motor generator MG2 according to the MG2 output determined in step S320. The torque command value for motor generator MG2 is generally set to a positive torque during power running of generating a vehicle driving power and set to a negative torque during regenerative braking of exerting a vehicle driving power.

Furthermore, hybrid vehicle 500 is provided with not-shown hydraulic brakes for the wheels including driving wheels 540a and is controlled such that a required braking power for the entire vehicle, which is calculated in step S300, is secured based on the sum of a braking power generated by the hydraulic brakes and a braking power involving regenerative braking power generation by motor generator MG2. In other words, even when regenerative power generation by motor generator MG2 is not permitted due to strict charge control, the braking power for the entire vehicle is secured by not-shown hydraulic brakes. On the other hand, effective recovery of electric power is enabled by a regenerative braking operation performed by motor generator MG2 within a range of charge restriction on traction battery 520.

A part of functions of HV-ECU 590 realized by the process in steps S300-S330 shown in FIG. 19 as described above corresponds to "control device" in the present invention.

In this way, by applying the secondary battery charge/discharge control in accordance with the first and second embodiments and the modification of the second embodiment to a hybrid vehicle, motor generator MG2 for vehicle driving power generation can be operated with charge/discharge control in which overcharge and overdischarge and rapid deterioration progress are avoided and consideration is given so that the battery performance is fully achieved, even for traction battery 520 in such a usage manner that a charge operation and a discharge operation are repeated.

Here, in the third embodiment, an exemplary application to a series/parallel-type hybrid system capable of dividing and transmitting motive power from the engine into the axle (drive shaft) and the generator using a power split mechanism has been described, with attention to the output distribution of the vehicle driving power between the engine and the motor. However, the application of the present invention is not limited to such a case, and the secondary battery charge/discharge control in accordance with the present invention realized by generation of a load operation command based on behavior prediction may be applied to any equipment or system without any particular limitation of a load.

Furthermore, the present invention may also be applied to only one of discharge restriction and charge restriction, for example, in a case where only either power supply from the secondary battery to the load (discharge) or power supply from the load to the secondary battery (charge) is executed.

Although the embodiment of the present invention has been described above, it is clearly understood that the embodiments disclosed herein is illustrative rather than restrictive. The scope of the present invention is shown in the claims, and it is intended that all the modifications within the claims and the equivalencies to the claims should be embraced.

INDUSTRIAL APPLICABILITY

The charge/discharge control device for a secondary battery in accordance with the present invention may typically be applied to charge/discharge control for a secondary battery (for example, lithium-ion battery) mounted on an electric vehicle or a hybrid vehicle.

The invention claimed is:

1. A charge/discharge control device for a secondary battery configured to be capable of receiving/transmitting electric power from/to a load, the device being programmed to have:
   a battery state estimation portion sequentially calculating a state estimation value indicative of a battery state in the interior of said secondary battery according to a battery model capable of dynamically estimating an internal state of said secondary battery, based on a detection value by a sensor provided for said secondary battery;
   a deterioration rate prediction portion for predicting a deterioration rate of the secondary battery in a case where said secondary battery continuously inputs/outputs a prescribed power from a present time, based on said state estimation value at the present time estimated by said battery state estimation portion; and
   a load control portion generating an operation command for said load in consideration of the deterioration rate predicted by said deterioration rate prediction portion, based on an operation request to said load,
   wherein said deterioration rate prediction portion predicts respective said deterioration rates for a plurality of said prescribed power at the present time.

2. The charge/discharge control device for a secondary battery according to claim 1, further comprising a deterioration degree estimation portion estimating a deterioration degree or a remaining lifetime of said secondary battery, based on the detection value by said sensor, wherein
   said load control portion finds a deterioration rate range permissible at a present time, in consideration of said deterioration degree or said remaining lifetime estimated by said deterioration degree estimation portion, and in addition, generates an operation command for said load with restriction within such a charge/discharge power range of said secondary battery in that the deterioration rate predicted by said deterioration rate prediction portion falls within said deterioration rate range.

3. The charge/discharge control device for a secondary battery according to claim 1, wherein
   said secondary battery is formed of a lithium-ion battery, and
   said state estimation values include a lithium ion concentration distribution in the interior of the secondary battery.

4. The charge/discharge control device for a secondary battery according to claim 1, wherein
   said battery model includes a model equation estimating a concentration distribution of a material which ionizes by an electrode reaction, and
   said battery estimation portion sequentially calculates said state estimation value which reflects said concentration distribution estimated according to said model equation.

5. A hybrid vehicle comprising:
   an internal combustion engine and a motor configured to be capable of generating a driving power of a vehicle;
   a control device determining a driving power output by each of said internal combustion engine and said motor such that a required driving power for said vehicle as a whole is secured;
   a secondary battery configured to be capable of receiving/transmitting electric power from/to said motor; and
   a charge/discharge control device for said secondary battery, wherein
   said charge/discharge control device is programmed to sequentially calculate a state estimation value indicative of a battery state in the interior of said secondary battery according to a battery model capable of dynamically estimating an internal state of said secondary battery, based on a detection value by a sensor provided for said secondary battery, and in addition, predict a deterioration rate of the secondary battery in a case where said secondary battery continuously inputs/outputs a prescribed power from a present time, based on said state estimation value at the present time as estimated, and
   said control device is programmed to set an input/output permissible power of said motor with restriction within such a charge/discharge power range of said secondary battery in that deterioration of said secondary battery does not proceed significantly, based on said deterioration rate predicted by said charge/discharge control device, and in addition, determine a torque command value of said motor with restriction such that input/output power of said motor falls within a range of said input/output permissible power,
   wherein said charge/discharge control device is programmed to predict respective said deterioration rates for a plurality of said prescribed power at the present time, and
   said control device is programmed to set the input/output permissible power of said motor based on said deterioration rates predicted for said plurality of prescribed power.

6. The hybrid vehicle according to claim 5, wherein
said charge/discharge control device is further programmed to estimate a deterioration degree or a remaining lifetime of said secondary battery, based on the detection value by said sensor, and
said control device is programmed to find a deterioration rate range permissible at a present time, in consideration of said deterioration degree or said remaining lifetime estimated by said charge/discharge control device, and in addition, determine a charge/discharge power range of said secondary battery with restriction such that the predicted deterioration rate falls within said deterioration rate range.

7. The hybrid vehicle according to claim 5, wherein
said secondary battery is formed of a lithium-ion battery, and
said state estimation value includes a lithium ion concentration distribution in the interior of the secondary battery.

8. The hybrid vehicle according to claim 5, wherein
said battery model includes a model equation estimating a concentration distribution of a material which ionizes by an electrode reaction, and
said control device is programmed to sequentially calculate said state estimation value which reflects said concentration distribution estimated according to said model equation.

9. The hybrid vehicle according to claim 5, wherein said sensor is selected from the group consisting of a current sensor and a voltage sensor.

* * * * *